(12) United States Patent
Hall et al.

(10) Patent No.: US 12,115,827 B2
(45) Date of Patent: Oct. 15, 2024

(54) MOTION CONTROL SYSTEM

(71) Applicant: APPLE INC., Cupertino, CA (US)

(72) Inventors: Jonathan L. Hall, Menlo Park, CA (US); Jacob L. Dawson, Sunnyvale, CA (US); Paul J. Keas, San Jose, CA (US); Troy A. Carter, Sunnyvale, CA (US); Roland R. Smith, Sunnyvale, CA (US)

( * ) Notice: Subject to any disclaimer, the term of this patent is extended or adjusted under 35 U.S.C. 154(b) by 0 days.

(21) Appl. No.: 18/195,579

(22) Filed: May 10, 2023

(65) Prior Publication Data
US 2023/0278386 A1    Sep. 7, 2023

Related U.S. Application Data

(63) Continuation of application No. 17/735,145, filed on May 3, 2022, now Pat. No. 11,701,942, which is a (Continued)

(51) Int. Cl.
*B60G 15/04*    (2006.01)
*B60G 11/27*    (2006.01)
(Continued)

(52) U.S. Cl.
CPC .......... *B60G 17/0521* (2013.01); *B60G 11/27* (2013.01); *B60G 15/04* (2013.01);
(Continued)

(58) Field of Classification Search
CPC ............... B60G 17/0155; B60G 17/06; B60G 2202/152; B60G 2202/322; B60G 17/021;
(Continued)

(56) References Cited

U.S. PATENT DOCUMENTS 2,757,938 A    8/1956    Crowder
2,901,239 A    8/1959    Sethna
(Continued)

FOREIGN PATENT DOCUMENTS

CN    101065259 A    10/2007
CN    108215946 A    6/2018
(Continued)

OTHER PUBLICATIONS

Monroe Intelligent Suspension, "CVSA2/Kinetic: Low Energy For High Performance", www.monroeintelligentsuspension.com/products/cvsa2-kinetic/, Date Unknown, Downloaded Mar. 2, 2017, 2 pp.
(Continued)

*Primary Examiner* — Toan C To
(74) *Attorney, Agent, or Firm* — Young Basile Hanlon & MacFarlane, P.C.

(57) ABSTRACT

A motion control system includes a top mount, a bottom mount, a rigid housing, an air spring, and a linear actuator. The air spring transfers force of a first load path between the top mount and the bottom mount. The air spring includes a pressurized cavity containing pressurized gas that transfers the force of the first load path. The linear actuator transfers force of a second load path between the top mount and the bottom mount in parallel to the first load path. The rigid housing defines at least part of the pressurized cavity and transfers the force of the second load path.

21 Claims, 18 Drawing Sheets

Related U.S. Application Data continuation of application No. 16/611,612, filed as application No. PCT/US2018/029753 on Apr. 27, 2018, now Pat. No. 11,358,431.

(60) Provisional application No. 62/503,093, filed on May 8, 2017.

(51) Int. Cl.
| | | |
|---|---|---|
| *B60G 15/10* | (2006.01) | |
| *B60G 17/015* | (2006.01) | |
| *B60G 17/052* | (2006.01) | |
| *B60G 17/06* | (2006.01) | |
| *F16H 25/22* | (2006.01) | |
| *B60G 17/02* | (2006.01) | |
| *F16H 25/20* | (2006.01) | |

(52) U.S. Cl.
CPC .......... *B60G 15/10* (2013.01); *B60G 17/0155* (2013.01); *B60G 17/06* (2013.01); *F16H 25/2204* (2013.01); *B60G 17/021* (2013.01); *B60G 2202/152* (2013.01); *B60G 2202/322* (2013.01); *B60G 2202/42* (2013.01); *B60G 2206/41* (2013.01); *B60G 2206/42* (2013.01); *B60G 2500/10* (2013.01); *B60G 2500/201* (2013.01); *B60G 2500/22* (2013.01); *B60G 2500/30* (2013.01); *B60G 2800/162* (2013.01); *F16H 2025/2075* (2013.01); *F16H 2025/2078* (2013.01)

(58) Field of Classification Search
CPC ............ B60G 2202/42; B60G 2206/42; B60G 2206/41; B60G 2500/10; B60G 2500/201; B60G 2500/22; B60G 2500/30; B60G 2800/162; F16H 2025/2075; F16H 2025/2078
See application file for complete search history.

(56) References Cited

U.S. PATENT DOCUMENTS

| | | |
|---|---|---|
| 2,913,252 A | 11/1959 | Norrie |
| 3,089,710 A | 5/1963 | Fiala |
| 3,236,334 A | 2/1966 | Wallerstein, Jr. |
| 3,292,945 A | 12/1966 | Dangauthier |
| 3,322,379 A | 5/1967 | Flannelly |
| 3,368,824 A | 2/1968 | Julien |
| 3,441,238 A | 4/1969 | Flannelly |
| 3,741,581 A | 6/1973 | Patrin |
| 3,781,032 A | 12/1973 | Jones |
| 3,820,812 A | 6/1974 | Stubbs et al. |
| 3,970,162 A | 7/1976 | Le Salver et al. |
| 4,206,935 A | 6/1980 | Sheppard et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,614,359 A | 9/1986 | Lundin et al. |
| 4,634,142 A | 1/1987 | Woods et al. |
| 4,637,628 A | 1/1987 | Perkins |
| 4,643,270 A | 2/1987 | Beer |
| 4,659,106 A | 4/1987 | Fujita et al. |
| 4,784,378 A | 11/1988 | Ford |
| 4,834,416 A | 5/1989 | Shimoe et al. |
| 4,877,098 A | 10/1989 | Asanuma |
| 4,893,832 A | 1/1990 | Booher |
| 4,922,159 A | 5/1990 | Phillips et al. |
| 4,960,290 A | 10/1990 | Bose |
| 4,981,309 A | 1/1991 | Froeschle et al. |
| 4,991,698 A | 2/1991 | Hanson |
| 5,027,048 A * | 6/1991 | Masrur ............... B60G 17/021 |
| | | 318/806 |
| 5,033,028 A | 7/1991 | Browning |
| 5,060,959 A | 10/1991 | Davis et al. |
| 5,172,930 A | 12/1992 | Boye et al. |
| 5,244,053 A | 9/1993 | Kashiwagi |
| 5,251,926 A | 10/1993 | Aulerich et al. |
| 5,364,081 A | 11/1994 | Hartl |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,588,368 A | 12/1996 | Richter et al. |
| 5,623,878 A | 4/1997 | Baxter et al. |
| 5,645,250 A | 7/1997 | Gevers |
| 5,678,847 A | 10/1997 | Izawa et al. |
| 5,765,859 A | 6/1998 | Nowell et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,142,494 A | 11/2000 | Higuchi |
| 6,170,838 B1 | 1/2001 | Laurent et al. |
| 6,233,510 B1 | 5/2001 | Platner et al. |
| 6,249,728 B1 | 6/2001 | Streiter |
| 6,276,710 B1 | 8/2001 | Sutton |
| 6,314,353 B1 | 11/2001 | Ohsaku et al. |
| 6,357,770 B1 | 3/2002 | Carpiaux et al. |
| 6,364,078 B1 | 4/2002 | Parison et al. |
| 6,443,436 B1 | 9/2002 | Schel |
| 6,470,248 B2 | 10/2002 | Shank et al. |
| 6,502,837 B1 | 1/2003 | Hamilton et al. |
| 6,513,819 B1 | 2/2003 | Oliver et al. |
| 6,634,445 B2 | 10/2003 | Dix et al. |
| 6,637,561 B1 | 10/2003 | Collins et al. |
| 6,722,676 B2 | 4/2004 | Zadok |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,135,794 B2 | 11/2006 | Kuhnel |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,818,109 B2 | 10/2010 | Scully |
| 7,823,891 B2 | 11/2010 | Bushko et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |

(56) References Cited

U.S. PATENT DOCUMENTS

| | | |
|---|---|---|
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,398,091 B2 | 3/2013 | Inoue et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,469,164 B2 | 6/2013 | Kondo et al. |
| 8,490,761 B2 | 7/2013 | Kondo |
| 8,499,903 B2 | 8/2013 | Sakuta et al. |
| 8,525,453 B2 | 9/2013 | Ogawa |
| 8,544,620 B2 | 10/2013 | Inoue et al. |
| 8,548,678 B2 | 10/2013 | Ummethala et al. |
| 8,579,311 B2 | 11/2013 | Butlin, Jr. et al. |
| 8,598,831 B2 | 12/2013 | Ogawa et al. |
| 8,632,078 B2 | 1/2014 | Ehrlich et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,793,052 B2 | 7/2014 | Inoue et al. |
| 8,890,461 B2 | 11/2014 | Knox et al. |
| 8,930,074 B1 | 1/2015 | Lin |
| 8,938,333 B2 | 1/2015 | Bose et al. |
| 9,062,983 B2 | 6/2015 | Zych |
| 9,079,473 B2 | 7/2015 | Lee et al. |
| 9,102,209 B2 | 8/2015 | Giovanardi et al. |
| 9,291,300 B2 | 3/2016 | Parker et al. |
| 9,316,667 B2 | 4/2016 | Ummethala et al. |
| 9,349,304 B2 | 5/2016 | Sangermano, II et al. |
| 9,399,384 B2 | 7/2016 | Lee et al. |
| 9,428,029 B2 | 8/2016 | Job |
| 9,533,539 B2 | 1/2017 | Eng et al. |
| 9,550,495 B2 | 1/2017 | Tatourian et al. |
| 9,625,902 B2 | 4/2017 | Knox |
| 9,643,467 B2 | 5/2017 | Selden et al. |
| 9,702,349 B2 | 7/2017 | Anderson et al. |
| 9,855,887 B1 | 1/2018 | Potter et al. |
| 9,868,332 B2 | 1/2018 | Anderson et al. |
| 9,975,391 B2 | 5/2018 | Tseng et al. |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,407,035 B1 | 9/2019 | Gadda et al. |
| 10,513,161 B2 | 12/2019 | Anderson et al. |
| 10,906,370 B1 * | 2/2021 | Hall ............... B60G 17/0157 |
| 11,124,035 B1 | 9/2021 | Hall et al. |
| 11,173,766 B1 | 11/2021 | Hall et al. |
| 11,345,209 B1 | 5/2022 | Carter et al. |
| 11,358,431 B2 | 6/2022 | Hall et al. |
| 11,884,260 B2 | 1/2024 | Dakemoto et al. |
| 2001/0045719 A1 | 11/2001 | Smith |
| 2002/0190486 A1 | 12/2002 | Phillis et al. |
| 2003/0030241 A1 | 2/2003 | Lawson |
| 2003/0080526 A1 | 5/2003 | Conover |
| 2004/0054455 A1 | 3/2004 | Voight et al. |
| 2004/0074720 A1 | 4/2004 | Thieltges |
| 2004/0094912 A1 | 5/2004 | Niwa et al. |
| 2004/0226788 A1 | 11/2004 | Tanner |
| 2004/0232648 A1 | 11/2004 | Ohki |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0211516 A1 * | 9/2005 | Kondo .................. F16F 15/035 |
| | | 188/267 |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0267296 A1 | 11/2006 | Dodd et al. |
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0111334 A1 | 5/2008 | Inoue et al. |
| 2008/0164111 A1 * | 7/2008 | Inoue ............... B60G 17/0157 |
| | | 188/297 |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |
| 2009/0108546 A1 | 4/2009 | Ohletz et al. |
| 2009/0120745 A1 * | 5/2009 | Kondo ............... B60G 17/0157 |
| | | 188/267 |
| 2009/0121398 A1 * | 5/2009 | Inoue ............... B60G 17/0157 |
| | | 267/140.14 |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0223322 A1 | 9/2009 | Kossira et al. |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059944 A1 * | 3/2010 | Oteman .................. H02K 7/06 |
| | | 74/25 |
| 2010/0059959 A1 | 3/2010 | Kim |
| 2010/0152969 A1 | 6/2010 | Li et al. |
| 2010/0200343 A1 * | 8/2010 | Kondo .................. B60G 13/02 |
| | | 188/267 |
| 2010/0207344 A1 | 8/2010 | Nakamura |
| 2010/0222960 A1 | 9/2010 | Oida et al. |
| 2010/0230876 A1 | 9/2010 | Inoue et al. |
| 2010/0252376 A1 | 10/2010 | Chern et al. |
| 2010/0253019 A1 | 10/2010 | Ogawa |
| 2011/0025000 A1 * | 2/2011 | Inoue ............... B60G 17/0157 |
| | | 280/5.507 |
| 2011/0115183 A1 | 5/2011 | Alesso et al. |
| 2011/0196579 A1 | 8/2011 | Tokimasa et al. |
| 2011/0218707 A1 * | 9/2011 | Inoue .................... B60G 17/06 |
| | | 280/124.157 |
| 2011/0277241 A1 | 11/2011 | Schejbal |
| 2011/0298399 A1 * | 12/2011 | Ogawa .................. F16F 15/03 |
| | | 318/14 |
| 2012/0013277 A1 * | 1/2012 | Ogawa ..................... H02P 3/12 |
| | | 318/368 |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 * | 7/2012 | Kondo .................... B60G 13/14 |
| | | 280/5.514 |
| 2012/0193847 A1 | 8/2012 | Muragishi et al. |
| 2012/0305348 A1 | 12/2012 | Katayama et al. |
| 2012/0306170 A1 * | 12/2012 | Serbu ............... B60G 17/0195 |
| | | 280/5.514 |
| 2013/0060422 A1 | 3/2013 | Ogawa et al. |

(56) References Cited

U.S. PATENT DOCUMENTS

| | | |
|---|---|---|
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0249464 A1* | 9/2013 | Knox ............... H02K 7/06 318/625 |
| 2013/0253764 A1 | 9/2013 | Kikuchi et al. |
| 2013/0341143 A1 | 12/2013 | Brown |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0326430 A1 | 11/2014 | Carpenter et al. |
| 2014/0358378 A1 | 12/2014 | Howard et al. |
| 2015/0102569 A1 | 4/2015 | Slawson |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2015/0259028 A1 | 9/2015 | Ishikawa et al. |
| 2015/0343876 A1 | 12/2015 | Yoshizawa et al. |
| 2015/0360532 A1 | 12/2015 | Kim |
| 2016/0059658 A1 | 3/2016 | Kuriki |
| 2016/0096458 A1 | 4/2016 | Parker et al. |
| 2016/0129967 A1 | 5/2016 | Sasaki et al. |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0291574 A1 | 10/2016 | Parison |
| 2016/0339823 A1 | 11/2016 | Smith et al. |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129298 A1 | 5/2017 | Lu et al. |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0056748 A1 | 3/2018 | Grimes |
| 2018/0065438 A1 | 3/2018 | Ogawa et al. |
| 2018/0079272 A1 | 3/2018 | Aikin |
| 2018/0089901 A1 | 3/2018 | Rober et al. |
| 2018/0093707 A1 | 4/2018 | Tokioka et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |
| 2018/0162187 A1 | 6/2018 | Trangbaek |
| 2018/0195570 A1 | 7/2018 | Churchill et al. |
| 2018/0208009 A1 | 7/2018 | McGuire et al. |
| 2018/0222274 A1 | 8/2018 | Davis et al. |
| 2018/0297587 A1 | 10/2018 | Kasaiezadeh Mahabadi et al. |
| 2018/0345747 A1 | 12/2018 | Boon et al. |
| 2018/0370314 A1 | 12/2018 | Higle |
| 2019/0023094 A1 | 1/2019 | Panagis et al. |
| 2019/0118604 A1 | 4/2019 | Suplin et al. |
| 2019/0193505 A1 | 6/2019 | Balogh et al. |
| 2019/0248203 A1* | 8/2019 | Krehmer ............... B60G 13/14 |
| 2019/0308484 A1 | 10/2019 | Belter et al. |
| 2020/0088214 A1 | 3/2020 | Woodard et al. |
| 2020/0171907 A1 | 6/2020 | Hall et al. |
| 2020/0180386 A1 | 6/2020 | Tabata et al. |
| 2020/0216128 A1 | 7/2020 | Doerksen |
| 2021/0061046 A1 | 3/2021 | Simon et al. |

FOREIGN PATENT DOCUMENTS

| | | |
|---|---|---|
| CN | 208439009 U | 1/2019 |
| DE | 19853876 A1 | 5/2000 |
| DE | 19850169 C1 | 7/2000 |
| DE | 102008025020 A1 | 11/2009 |
| DE | 102009023894 A1 | 12/2009 |
| DE | 102009060213 A1 | 6/2011 |
| DE | 102010041404 A1 | 3/2012 |
| DE | 202012002846 U1 | 7/2012 |
| DE | 102015003530 A1 | 9/2016 |
| DE | 102016000686 A1 | 7/2017 |
| DE | 102017106810 A1 | 10/2018 |
| DE | 102018208774 A1 | 12/2019 |
| EP | 0895882 A1 | 2/1999 |
| EP | 1693233 B1 | 4/2009 |
| EP | 2072855 A1 | 6/2009 |
| EP | 2199121 A1 | 6/2010 |
| EP | 2233330 B1 | 2/2013 |
| EP | 3088230 A1 | 11/2016 |
| GB | 2220625 A | 1/1990 |
| GB | 2437633 A | 10/2007 |
| JP | H08197931 A | 8/1996 |
| JP | 2004155258 A | 6/2004 |
| JP | 2004237824 A | 8/2004 |
| JP | 2006071098 A | 3/2006 |
| JP | 2006200734 A | 8/2006 |
| JP | 2006327295 A | 12/2006 |
| JP | 2009185955 A | 8/2009 |
| JP | 2009191944 A | 8/2009 |
| JP | 2009274600 A | 11/2009 |
| JP | 2010-091030 A | 4/2010 |
| JP | 2011016475 A | 1/2011 |
| JP | 2011122644 A | 6/2011 |
| JP | 2012002300 A | 1/2012 |
| JP | 2012167757 A | 9/2012 |
| JP | 2013244841 A | 12/2013 |
| JP | 5623006 B2 | 11/2014 |
| JP | 5796315 B2 | 10/2015 |
| KR | 101509600 B1 | 4/2015 |
| KR | 20170095073 A | 8/2017 |
| WO | 9304883 A1 | 3/1993 |
| WO | 2011148792 A1 | 12/2011 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Bolognesi, P., et al., "FEM Modeling and Analysis of a Novel Rotary-Linear Isotropic Brushless Machine", XIX International Conference of Electrical Machines—ICEM 2010, Rome (6 pp).

(56) References Cited

OTHER PUBLICATIONS

Xu, Lei, et. al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

Edren, Johannes, "Motion Modelling and Control Strategies of Over-Actuated Vehicles", Doctoral Thesis, Stockholm 2014 (56 pp).

Daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

\* cited by examiner

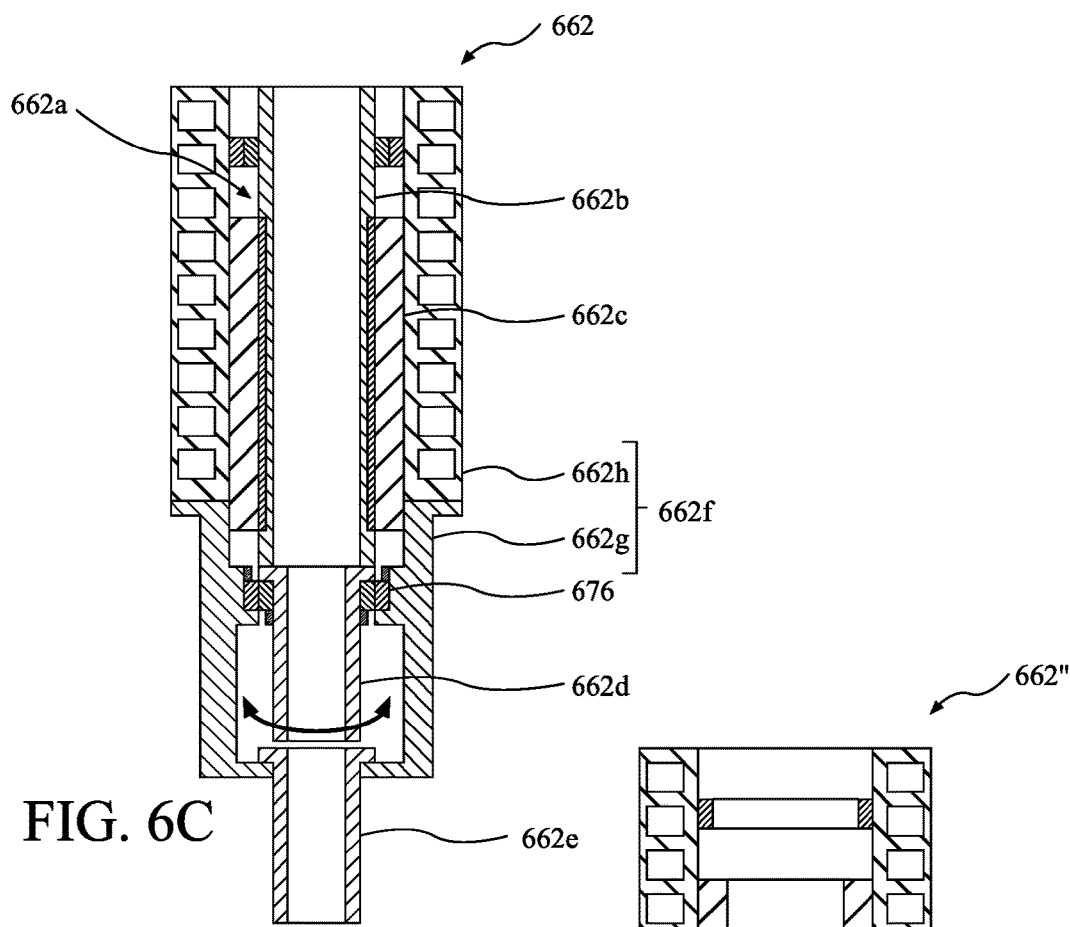
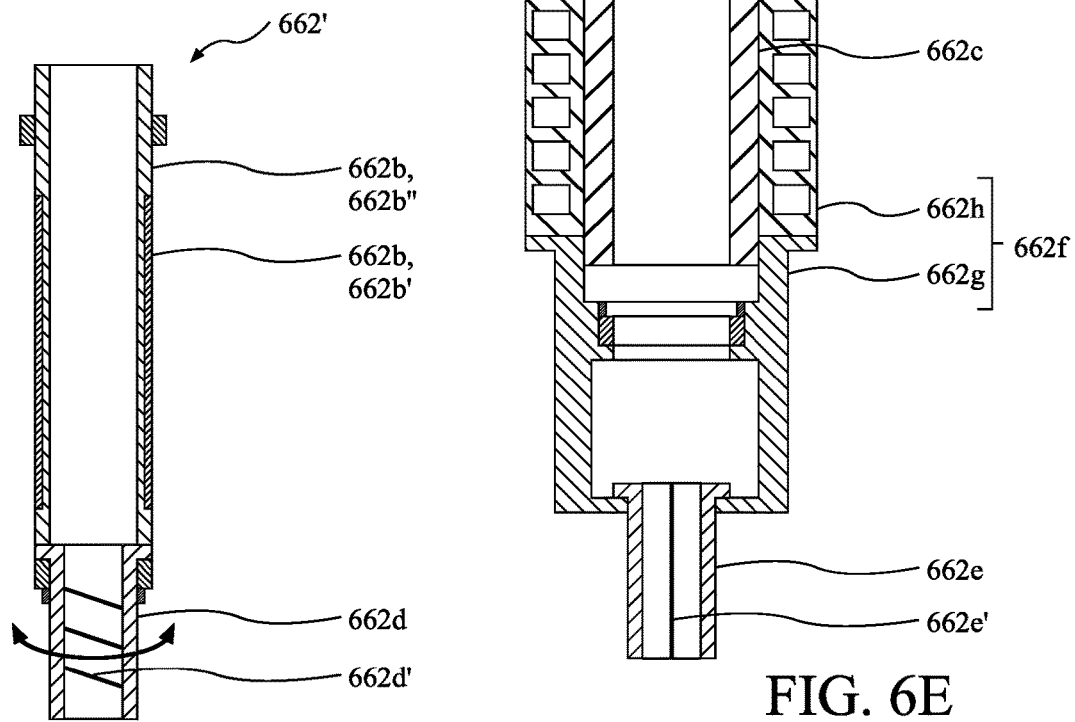
FIG. 6C
FIG. 6D
FIG. 6E

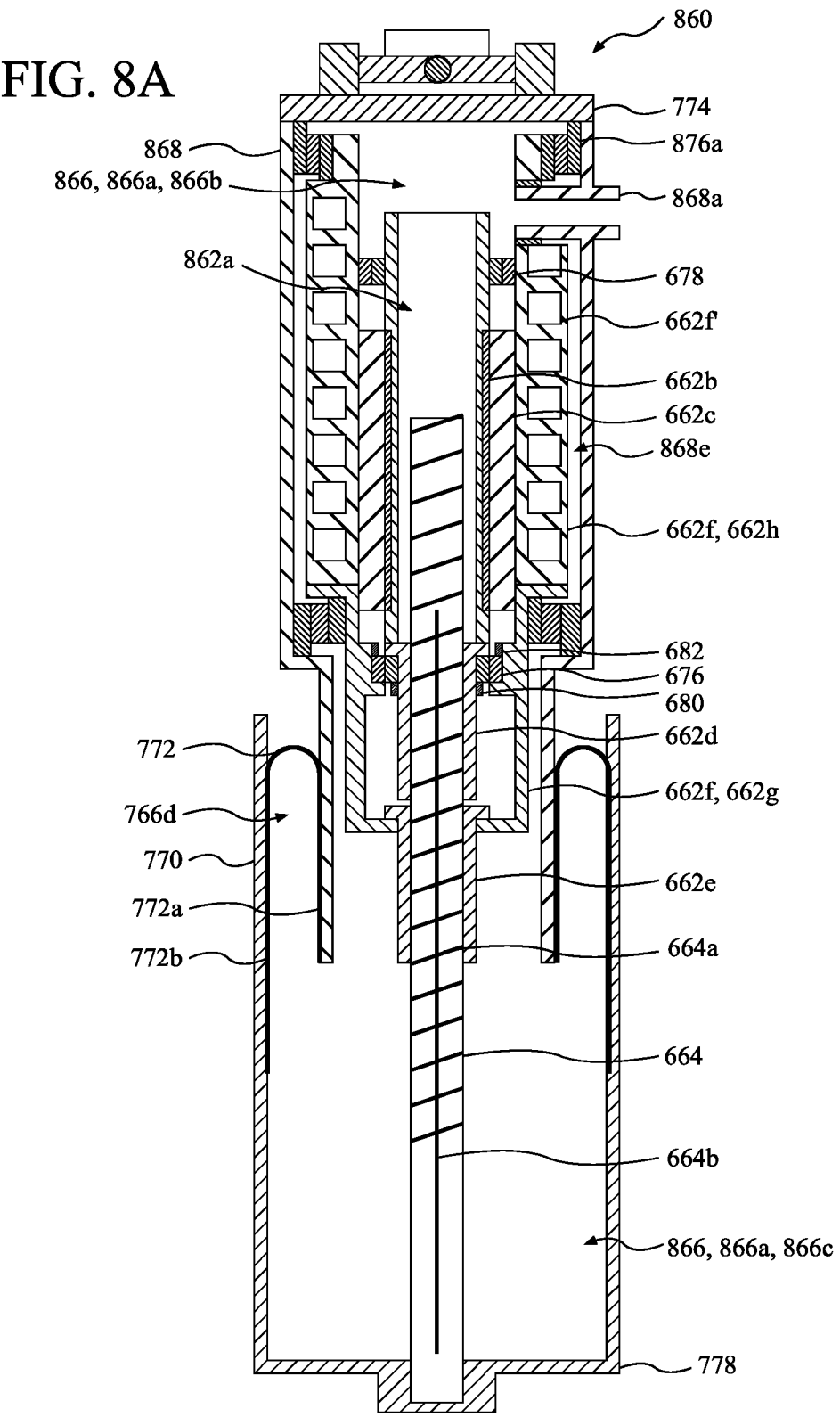

MOTION CONTROL SYSTEM

CROSS-REFERENCE TO RELATED APPLICATION(S)

This application is a continuation of U.S. application Ser. No. 17/735,145, filed May 3, 2022, which is a continuation of U.S. application Ser. No. 16/611,612, filed Nov. 7, 2019, which is a national stage application of International Application No. PCT/US2018/029753, filed Apr. 27, 2018, which claims priority to and the benefit of U.S. Provisional Application No. 62/503,093, filed May 8, 2017, the entire disclosures of which are incorporated by reference herein.

TECHNICAL FIELD

This disclosure relates to motion control systems.

BACKGROUND

Motion control systems control transmission of forces between a sprung mass and an unsprung mass. Traditional motion control systems are passive systems that include a spring-damper system of which the spring and the damper have fixed characteristics. Such fixed characteristics, however, may not be suited for user comfort given varying surface conditions and varying user preferences. Newer motion control systems are active systems of which various characteristics may be controlled by the user (e.g., an operator) or automatically in response to various detected conditions. For example, motion control systems may utilize an air spring to allow the user to select a desired height of the sprung mass. Magnetorheological dampers provide damping characteristics that may vary according to detected conditions, such as acceleration.

SUMMARY

In one aspect, a suspension system includes a top mount, a bottom mount, a rigid housing, an air spring, and a linear actuator. The air spring transfers force of a first load path between the top mount and the bottom mount. The air spring includes a pressurized cavity containing pressurized gas that transfers the force of the first load path. The linear actuator transfers force of a second load path between the top mount and the bottom mount in parallel to the first load path. The rigid housing defines at least part of the pressurized cavity and transfers the force of the second load path.

The rigid housing may be coupled to the top mount with an isolator that seals the pressurized cavity and transfers the force of the second load path between the rigid housing and the top mount.

The linear actuator and the rigid housing may form a first piston assembly of the air spring movable relative to the bottom mount, while the top mount may form a second piston assembly of the air spring movable relative to the bottom mount. Effective piston areas of the first piston assembly and the second piston assembly may be approximately equal.

The rigid housing may be coupled to the bottom mount with a flexible membrane that seals the pressurized cavity and permits the first piston assembly to move relative to the bottom mount, and the isolator permits the second piston assembly to move relative to the rigid housing. The pressurized cavity may be defined by the top mount, the isolator, the rigid housing, the flexible membrane, and the bottom mount.

The suspension system may further include a second rigid housing coupled to the bottom mount, wherein the flexible membrane is connected to the rigid housing and the second rigid housing to couple the rigid housing to the bottom mount, and the second rigid housing defines a lower chamber of the pressurized cavity.

The linear actuator may include a motor having a rotor and a stator that are contained in the pressurized cavity.

The stator may be in contact with an inner surface of the rigid housing.

The rigid housing may be a first rigid housing, while the suspension system further includes a second rigid housing that surrounds the first rigid housing, and the first rigid housing is coupled to the second rigid housing with an upper isolator and a lower isolator by which the force of the second load path is transferred therebetween.

Alternatively, the rigid housing may be a first rigid housing, while the suspension system further includes a second rigid housing surrounded by the first rigid housing, and the second rigid housing is coupled to the linear actuator and the first rigid housing to transfer the force of the second load path therebetween.

The pressurized cavity may include an upper chamber and a lower chamber, wherein the pressurized gas flows between the upper chamber and the lower chamber is at least one of around or through the linear actuator.

The rigid housing may be spaced radially apart from and surround the linear actuator to define a circumferential gap therebetween, while the pressurized gas flows between the upper chamber and the lower chamber through the circumferential gap. Instead or additionally, the pressurized gas flows between the upper chamber and the lower chamber through an inner housing of the linear actuator.

The linear actuator may be a ball screw actuator having a ball nut and a shaft, and torque is selectively applied to the ball nut by a motor to apply the force of the second load path to the shaft.

The linear actuator may include a ball spline that prevents rotation of the shaft relative to the rigid housing.

A vehicle may include a vehicle body, one or more unsprung components, and one or more of the suspension systems, the top mount of each of the suspension system being coupled to the vehicle body and the bottom mount of each suspension system being coupled to one of the unsprung components.

The vehicle may include a pressurized air source in fluidic communication with the one or more suspension systems for supplying the pressurized gas to the pressurized cavities thereof, and a control system for controlling the linear actuators of the one or more suspension systems in response to dynamic loading between the vehicle body and the unsprung component coupled thereto.

The vehicle may include four of the unsprung components and four of the suspension systems.

A suspension system includes a spring and a ball-screw actuator. The spring is configured to form a first load path between a vehicle body of a vehicle and an unsprung component of the vehicle. The ball-screw actuator is configured to form a second load path between the vehicle body and the unsprung component in parallel to the first load path. The ball-screw actuator includes a shaft, a housing, a motor, a ball nut, and a ball spline. The motor is coupled to the housing and includes a stator and a rotor. The motor applies torque to the ball nut to transfer force of the second load path between the housing and the shaft. The ball spline applies torque to the shaft to prevent rotation thereof relative to the housing. The housing, the stator, and the ball spline are coupled to each other to form a stationary assembly. The rotor and the ball nut are coupled to each other to form a rotating assembly that is rotatably supported and axially fixed to the stationary assembly with a thrust bearing.

The thrust bearing may be coupled to the ball nut and the housing. The rotating assembly may be further rotatably supported by the housing with another bearing coupled to the housing and the rotor. The other bearing may be spaced apart from and positioned axially above the thrust bearing. The stator may be positioned axially between the thrust bearing and the other bearing. The spring may be one of a coil spring or an air spring. The housing may be an inner housing, while the suspension system further includes an outer housing to which the inner housing is coupled and which surrounds the inner housing, the motor, and the ball nut. The inner housing may be coupled to the outer housing with a first tube isolator positioned above the stator. The inner housing may be coupled to the outer housing with a second tube isolator positioned below at least a portion of the stator.

A ball screw actuator includes a housing, a motor, a shaft, a ball nut, and a ball spline. The motor is position in the housing. The housing surrounds the motor and includes cooling passages for receiving a fluid for cooling the motor. The shaft moves axially within the housing. The motor applies torque to the ball nut for transferring axial force between the housing and the shaft. The ball spline transfers torque between the housing and the shaft to prevent rotation therebetween. The housing is coupled to the ball nut to allow rotation therebetween and prevent axial movement therebetween. The housing is coupled to the ball spline to prevent rotation and axial movement therebetween.

The housing may be coupled to the ball nut with a thrust bearing. A rotor of the motor may be rotatably coupled to the housing with another bearing positioned above the thrust bearing. The housing may extend from above the motor to below the ball nut. The ball spline may be positioned below the ball nut and be coupled to a lower end of the housing.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6C is a cross-sectional view of an actuator of the suspension system of FIG. 6A.

FIG. 6D is a cross-sectional view of a rotating structure of the suspension system of FIG. 6A.

FIG. 6E is a cross-sectional view of a stationary structure of the suspension system of FIG. 6A.

FIG. 8A is a cross-sectional schematic view of another suspension system for use in the vehicle of FIG. 1.

DETAILED DESCRIPTION

Disclosed herein are various embodiments of a vehicle 100 and functional subsystems thereof, including a suspension system 160. More particularly, the suspension system 160 is an active suspension system, which is configured to control generally vertical motion of the wheels with a linear actuator that can apply upward and downward force to introduce energy into and absorb energy from the wheels.

Figure 1:
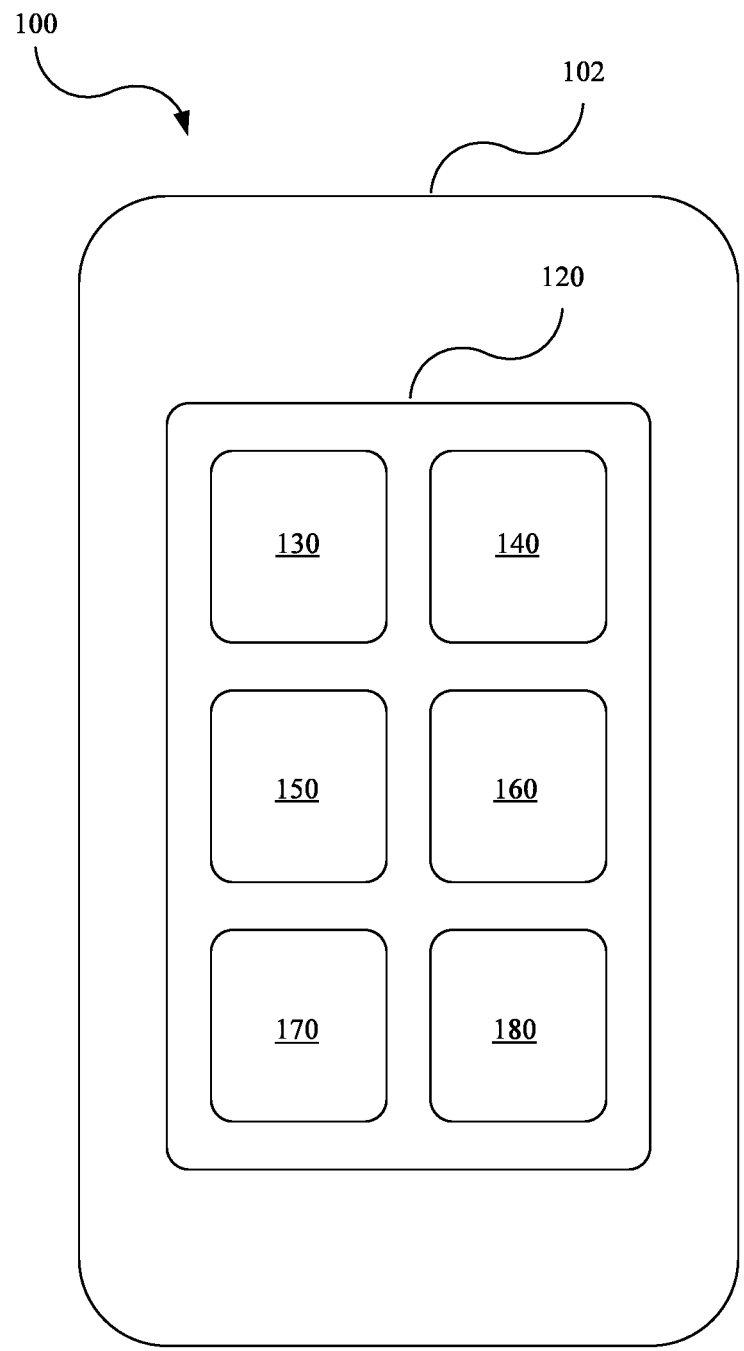
FIG. 1 is a schematic view of a vehicle according to an exemplary embodiment.

Referring to FIG. 1, the vehicle 100 generally includes a vehicle body 102 and a drive system 120 connected to the vehicle body 102. The vehicle body 102 may, for example, include or define a passenger compartment for carrying passengers. The drive system 120 is configured to move the vehicle 100, including the passenger compartment. The drive system 120 includes various functional subsystems, including a propulsion system 130 (i.e., for propelling the vehicle 100), a braking system 140 (i.e., for slowing the vehicle 100), a steering system 150 (i.e., for directing the vehicle 100 in different directions), a suspension system 160 (i.e., for supporting the vehicle 100), a sensing system 170 (i.e., for sensing various aspects of the vehicle 100, including the various subsystems and the external environment), and a control system 180 (i.e., for controlling the various other subsystems individually or in a coordinated manner). The drive system 120 may be an autonomous drive system that operates the various functional subsystems to move the vehicle 100 to a user-selected location without further input from the user.

Figure 2:
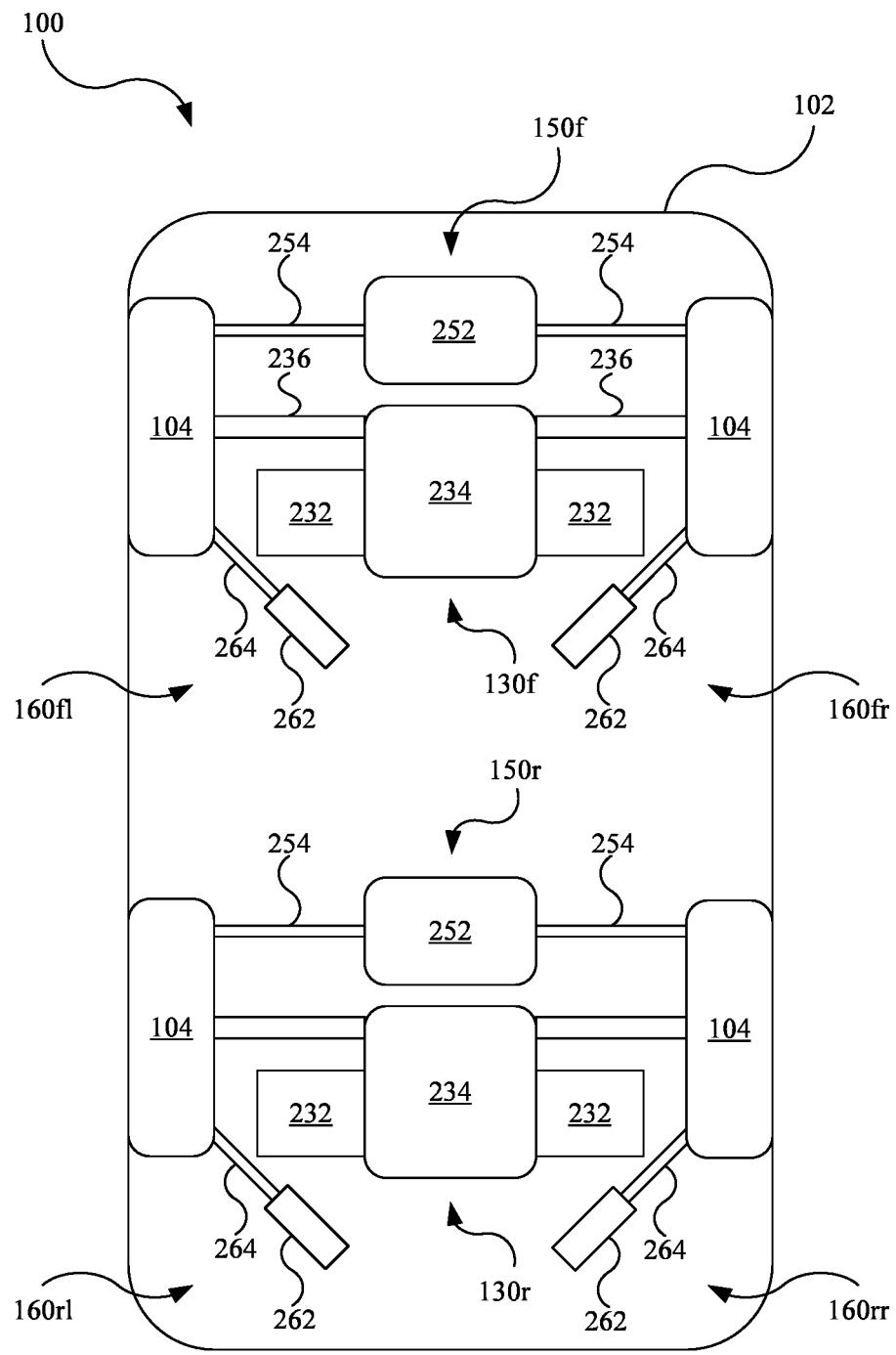
FIG. 2 is another schematic view of the vehicle of FIG. 1.

Referring to FIG. 2, the vehicle 100 includes wheels 104 (e.g., four) that are coupled to and support the vehicle body 102 (e.g., on a public roadway). The wheels 104 may be coupled to the vehicle body 102, for example, with the propulsion system 130, the steering system 150, and the suspension system 160. The wheels 104 may include tires (not separately shown or labeled), such that each wheel 104 may be considered a subassembly of a wheel rim and a tire.

The propulsion system 130 generally includes one or more motors 232, one or more gearboxes 234, and drive shafts 236 (e.g., half-shafts) operatively connecting each wheel 104 to one of the gearboxes 234. Broadly speaking, the motors 232 provide torque to the gearboxes 234, the gearboxes 234 alter the output torque (e.g., increase) and output speed (e.g., decrease) of the motors 232, and the drive shafts 236 transfer torque from the gearboxes 234 to the wheels 104. The motors 232 may provide positive torque for propelling the vehicle 100 in a forward direction and for decelerating the vehicle 100 when moving in a rearward direction, and may provide negative torque for propelling the vehicle 100 in a rearward direction and for deceleration the vehicle 100 when moving in a forward direction. The motors 232 may also function as generator, when receiving torque from the wheels 104, and function to recharge a battery (not shown) or other energy storage system of the vehicle 100. As shown, the propulsion system 130 may include a front propulsion system 130f and a rear propulsion system 130r that each include two motors 232 coupled to a single gearbox 234 and associated with one drive shaft 236 and the one wheel 104 coupled thereto. Variations of the propulsion system 130 are contemplated, which may include a different number of driven wheels 104 (e.g., only front or rear wheels being driven), a different number of motors 232 associated with the wheels 104 (e.g., one motor 232 associated with two wheels 104), and a different number of gearboxes 234 associated with the wheels 104 (e.g., one gearbox 234 dedicated for each wheel 104).

The braking system 140 generally provides deceleration torque via friction for decelerating the vehicle 100 when moving in the forward direction and/or when moving in the rearward direction.

The steering system 150 generally includes one or more steering actuators 252 and steering linkages 254 operatively coupling each wheel 104 to one of the steering actuators 252. Broadly speaking, the steering system 150 controls the pivoted position of the wheels 104 about generally vertical axes. The steering actuators 252 move the steering linkages 254 in inboard and outboard directions relative to the vehicle body 102 to, thereby, pivot the wheels 104 about the vertical axes. As shown, the steering system 150 may include a front steering system 150f and a rear steering system 150r that each include one steering actuator 252 that is associated with two steering linkages 254 and the wheels 104 coupled thereto. Variations of the steering system 150 are contemplated, which may include a different number of steering actuators 252 associated with the wheels 104 (e.g., one steering actuator 252 for each wheel 104).

The suspension system 160 generally includes an actuator 262 (e.g., suspension actuator) and a shaft 264 (e.g., suspension shaft) associated with each wheel 104. Mechanical components, including the actuator 262, the shaft 264, and other components discussed below, of the suspension system 160 may be considered an assembly (e.g., suspension assembly). Broadly speaking, the suspension system 160 controls vertical motion of the wheels 104 relative to the vehicle body 102, for example, to ensure contact between the wheels 104 and a surface of the roadway and to limit the influence of roadway conditions on undesirable movements of the vehicle body 102. The suspension system 160 is an active suspension system in which the actuators 262 transfer energy into and absorb energy from the wheels 104 with upward and downward movement relative to the vehicle body 102. As shown, the suspension system 160 may include a front left suspension system 160fl, a front right suspension system 160fr, a rear left suspension system 160rl, and a rear right suspension system 160rr, each of which include one actuator 262 and one shaft 264. Further details of the suspension system 160 are discussed in further detail below.

The sensing system 170 includes sensors for observing external conditions of the vehicle 100 (e.g., location of the roadway and other objects) and conditions of the vehicle 100 (e.g., acceleration and conditions of the various subsystems and their components). The sensing system 170 may include sensors of various types, including dedicated sensors and/or functional components of the various subsystems (e.g., actuators may function as sensors).

The control system 180 includes communication systems and components (i.e., for receiving sensor signals and sending control signals) and processing components (i.e., for processing the sensor signals and determining control operations), such as a controller. The control system 180 may include various control subsystems, for example, associated with (or as part) of one or more of the various other subsystems described herein (e.g., the propulsion system 130, the braking system 140, etc.).

Figure 5:
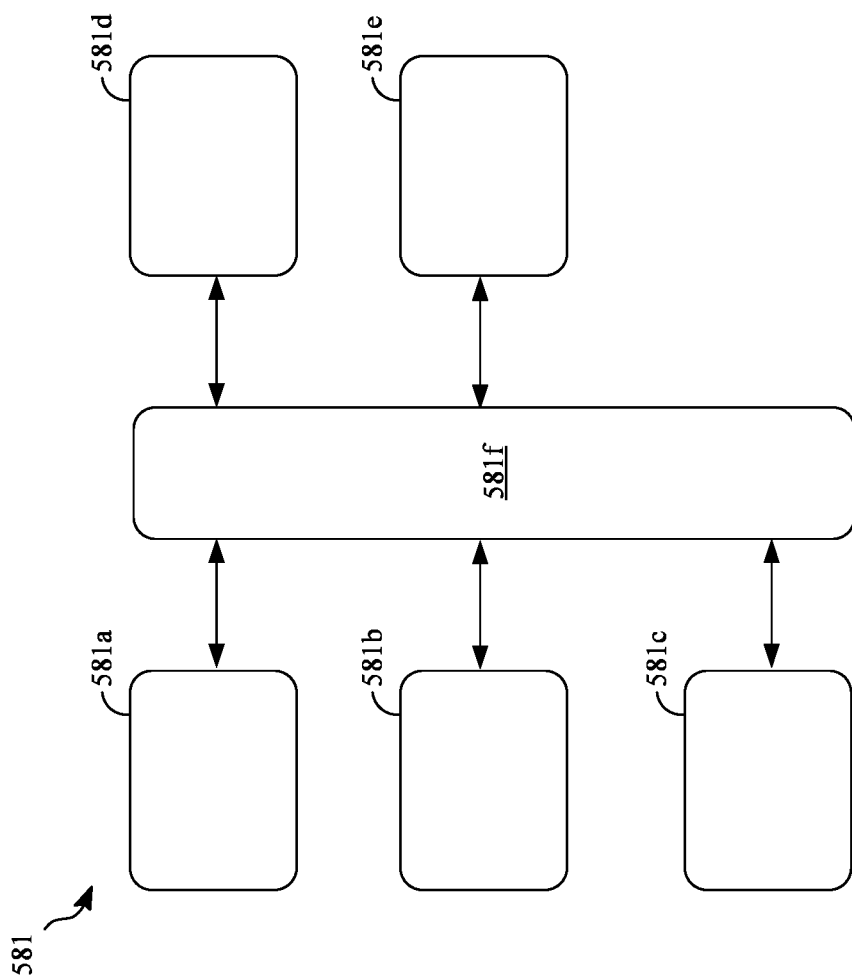
FIG. 5 is a schematic view of a controller.

Referring to FIG. 5, a hardware configuration for a controller 581 of the control system 180 is shown, which may be used to implement the apparatuses and systems described herein (e.g., to detect an impact upon occurrence thereof and/or predict an impact in expectation thereof, and to control the movement mechanisms). As an example, the controller 581 may output a command, such as a voltage value, to the various subsystems of the drive system 120 in response to signals received from the sensors of the sensing system 170.

The controller 581 may include a processor 581a, a memory 581b, a storage device 581c, one or more input devices 581d, and one or more output devices 581e. The controller 581 may include a bus 581f or a similar device to interconnect the components for communication. The processor 581a is operable to execute computer program instructions and perform operations described by the computer program instructions. As an example, the processor 581a may be a conventional device such as a central processing unit. The memory 581b may be a volatile, high-speed, short-term information storage device such as a random-access memory module. The storage device 581c may be a non-volatile information storage device such as a hard drive or a solid-state drive. The input devices 581d may include any type of human-machine interface such as buttons, switches, a keyboard, a mouse, a touchscreen input device, a gestural input device, an audio input device, the sensors of the sensing system 170. The output devices 581e may include any type of device operable to provide an indication to a user regarding an operating state, such as a display screen or an audio output, or any other functional output or control, such as the propulsion system 130, the braking system 140, the steering system 150, and/or the suspension system 160.

Figure 3:
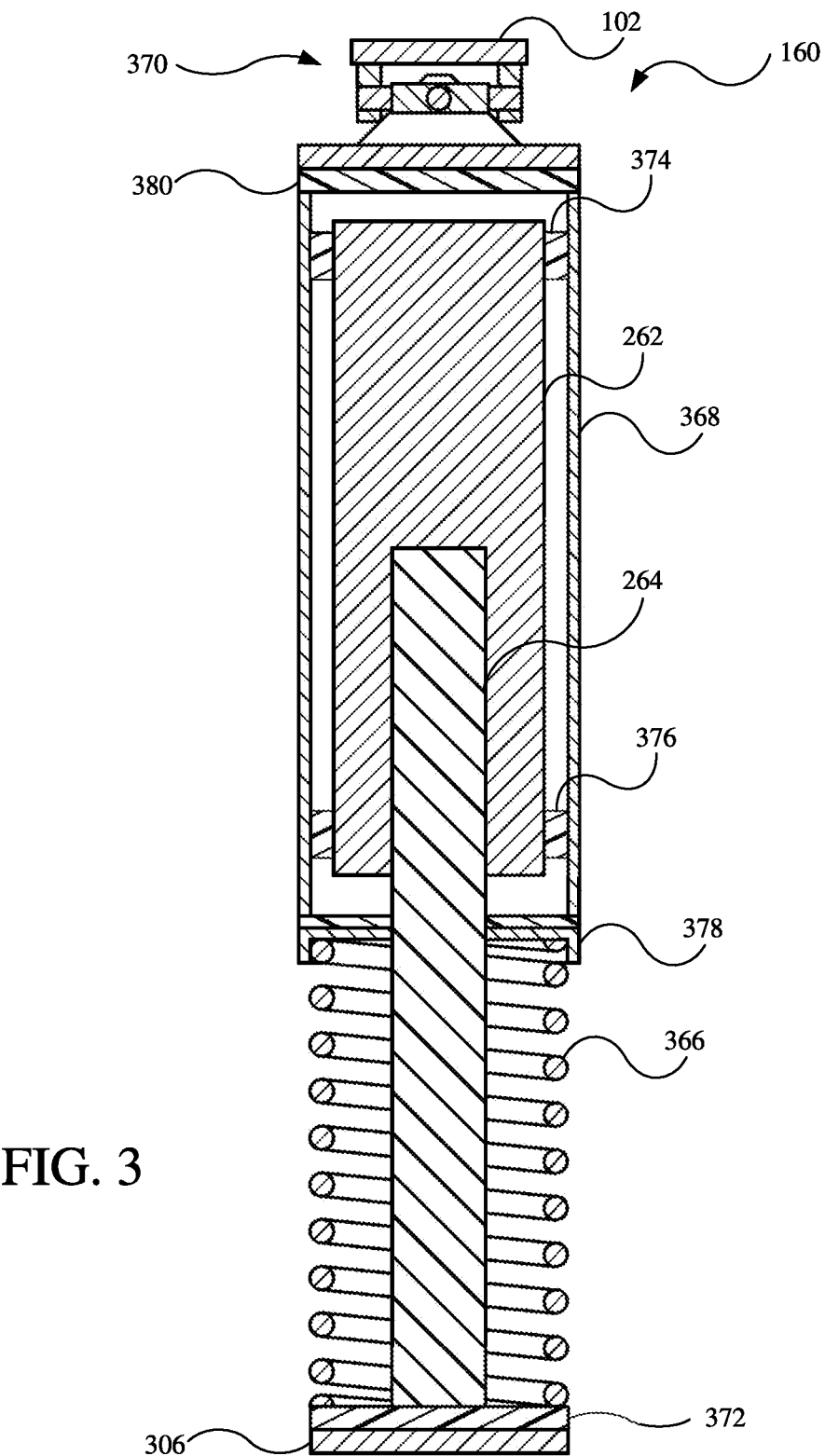
FIG. 3 is a cross-sectional schematic view a suspension system of the vehicle of FIG. 1.

Referring to FIG. 3, the suspension system 160 is configured as a strut assembly that is coupled at an upper end thereof to the vehicle body 102 and at a lower end thereof to an unsprung component 306 that supports the wheel 104. The unsprung component 306 moves upward and downward relative to the vehicle body 102 and may, for example, be a steering knuckle or a suspension control arm.

The suspension system 160 generally includes the actuator 262 and the shaft 264, along with a spring 366, which cooperatively function to transfer force axially between the unsprung component 306 and the vehicle body 102 through two load paths (e.g., dual paths). The spring 366 may be a coil spring (e.g., metal coil spring), or may be another suitable type of spring for use in the present suspension system 160 (e.g., an air spring, spring formed of another solid material, such as a composite). The first load path is formed by the spring 366 and carries a gravity preload of the vehicle 100 (i.e., load due to gravity irrespective of any dynamic loading) along with a portion of a dynamic load between the vehicle body 102 and the unsprung component 306. The second load path is formed by the actuator 262 and the shaft 264, which carries another portion of the dynamic load between the vehicle body and the unsprung component 306 and, as compared to the first load path, provides primary damping functions of the suspension system 160.

The suspension system 160 further includes a housing 368, a top mount 370, and a bottom mount 372, along with vibration isolators (e.g., dampers, bushings, etc.) and one or more load sensors 380. The housing 368 is coupled to both the actuator 262 and the spring 366 to transfer the second load path and the first load path, respectively, to and from the top mount 370 (i.e., to the vehicle body 102) and the bottom mount 372 (i.e., to the unsprung component 306). The actuator 262 is generally contained within the housing 368 and is coupled thereto with an upper inner isolator 374 (e.g., first vibration isolator, or upper actuator isolator) and a lower inner isolator 376 (e.g., second vibration isolator, or lower actuator isolator) that transfer axial, radial, and torsional forces there between. The spring 366 is coupled to a lower end of the housing 368 and includes an outer isolator 378 (e.g., third vibration isolator, lower isolator, or coil spring isolator) that transfers axial force there between.

Because the preload (i.e., vehicle weight) is applied to the suspension system 160 via the first load path through the spring 366 and bypasses the actuator 262, the second load path is nominal (e.g., near zero) in static or near static conditions, thereby allowing the upper inner isolator 374 and the lower inner isolator 376 to be significantly less stiff than the outer isolator 378. For example, the upper inner isolator 374 and the lower inner isolator 376, by not transferring the preload, may be configured with spring rate curves, damping coefficients, and other characteristics independent of the corresponding characteristics of the outer isolator 378. Moreover, upper inner isolator 374 and the lower inner isolator 376 may have different such characteristics than each other.

The top mount 370 is coupled to an upper end of the housing 368 and the vehicle body 102 to transfer forces to the vehicle body 102 (i.e., the first and second load paths). The bottom mount 372 is separately coupled to lower ends of the spring 366 and the shaft 264, respectively, to transfer force to the unsprung component 306 (i.e., the first and second load paths).

The actuator 262 is arranged above the spring 366, so as to be supported (e.g., suspended) from thereabove by the vehicle body 102. This orientation may provide several advantages as compared to mounting the actuator 262 below the spring 366 (i.e., as compared to supporting the actuator 262 with the unsprung component 306 from therebelow). For example, the actuator 262, by being supported by the vehicle body 102, is not unsprung mass, and also the actuator 262 is mounted closer to the vehicle body 102 for connection to power, data, and/or cooling lines at locations nearer the vehicle body 102 and less susceptible to damage (e.g., being impacted by debris).

The actuator 262 is a ball screw actuator, which converts rotational motion and torque from an electric motor (not labeled), respectively, into linear motion and force of the shaft 264. A torque output of the motor generally correlates to a linear force output of the actuator 262. Specific details of ball screw aspects of the actuator 262 are not discussed herein.

The actuator 262 functions to transfer energy to the wheel 104 to cause upward and downward motion of the wheel 104 relative to the vehicle body 102. The actuator 262 also functions to absorb energy from the wheel 104 (e.g., functioning as a damper), as the wheel 104 is moved upward and downward relative to the vehicle body 102 from external forces (i.e., external to the actuator 262). Upward movement from external forces is caused by a roadway applying an upward force to the wheel 104 as the vehicle 100 moves therealong. Downward movement from external forces is generally caused by gravity acting on the wheel 104 and/or the spring 366 applying a downward force to the wheel 104.

The actuator 262 includes a primary body 262a relative to which the shaft 264 is moved axially. The primary body 262a may, for example, form or contain a motor (e.g., forming a stator and containing a rotor of the motor) at an upper end thereof and a rotating nut (e.g., a ball nut) at a lower end thereof. As the nut is rotated by the motor, the nut engages the shaft 264 (via recirculating balls) and causes the shaft 264 to translate axially relative to the primary body 262a.

The primary body 262a is mounted within the housing 368 with the upper inner isolator 374 and the lower inner isolator 376, so as to transfer axial, radial, and rotational forces therebetween. The upper inner isolator 374 and the lower inner isolator 376 are configured to dampen and prevent noise and vibrations of the actuator 262 (e.g., from operating the motor and balls moving in a nut of the ball screw mechanism) from reaching the vehicle body 102, while also allowing the actuator 262 to move axially and radially relative to the housing 368.

Each of the upper inner isolator 374 and the lower inner isolator 376 are axially coupled, directly or indirectly, to inner and outer surfaces, respectively, of the housing 368 and the primary body 262a of the actuator 262 to transfer axial forces therebetween (i.e., the second load path). The upper inner isolator 374 and the lower inner isolator 376 are also arranged radially (e.g., concentrically) between the housing 368 and the primary body 262a to transfer radial forces therebetween (e.g., due to bending moments). The upper inner isolator 374 and the lower inner isolator 376 may also be rotationally coupled, directly or indirectly, to the housing 368 and the primary body 262a of the actuator to transfer rotational torque therebetween. The upper inner isolator 374 and the lower inner isolator 376 may, for example, be made of a suitable material (e.g., rubber or polymer) having suitable properties (e.g., damping characteristics and spring rate) due to material properties and/or structural characteristics thereof.

In the axial direction, the upper inner isolator 374 and the lower inner isolator 376 are configured to progressively deflect axially over a stroke (e.g., stroke distance) as axial force increases to a maximum design load. The maximum design load may be a peak (or near peak) load expected during operation of the vehicle 100 (e.g., an extreme condition during normal driving after which the suspension system 160 may be expected to continue operating). The maximum design load may, for example, be 10 kN, while a maximum design deflection (e.g., maximum stroke) may be 10 mm. A restorative spring force of the upper inner isolator 374 and the lower inner isolator 376 are preferably substantially linear over the stroke, for example, with the upper inner isolator 374 and the lower inner isolator 376 cooperatively providing an axial spring rate that is substantially constant (e.g., +/−25%, +/−15%, +/−10% or less) over the stroke, such as approximately 1 kn/mm. A substantially constant spring rate may be particularly advantageous for control strategies of the suspension system 160 (e.g., simplifying control strategies).

Alternatively, the restorative spring force may be substantially linear over a majority of the stroke. The spring rate may substantially constant over the first portion of the stroke (e.g., between approximately 75% and 90% of the stroke) and increase gradually over a second portion of the stroke (e.g., between 10% and 25% of the remaining stroke) to a markedly higher spring rate. This markedly higher spring rate in a second portion of the stroke may prevent harsh engagement between two generally rigid components of the suspension system 160 upon experiencing higher loading (e.g., near 10 kN).

In the radial direction, the upper inner isolator 374 and the lower inner isolator 376 are configured to prevent radial engagement of the actuator 262 (e.g., the primary body 262a) with the housing 368. In the radial direction, the upper inner isolator and the lower inner isolator 376 may be significantly less stiff than in the radial direction. Radial engagement between the actuator 262 and the housing 368 might otherwise occur as a bending moment is applied to the suspension system 160. Such a bending moment may, for example, arise from deflection of the unsprung component 306 relative to the vehicle body 102. To this end, the upper inner isolator 374 and the lower inner isolator 376 are, respectively, coupled to the primary body 262a at axially spaced apart locations, which reduces the radial force components of the bending moment experienced by each of the upper inner isolator 374 and the lower inner isolator 376 as the actuator 262 pivots about the other of the upper inner isolator 374 and the lower inner isolator 376. Larger axial spacing may allow the upper inner isolator 374 and the lower inner isolator 376 to be less stiff in the radial direction (i.e., having a lower restorative spring rate) and/or the housing 368 to be in closer proximity (e.g., being smaller) to the primary body 262a.

The top mount 370 permits the suspension system 160 to pivot relative to the vehicle body 102 with little resistance (e.g., freely or with low resistance) to prevent high bending moments from being applied to the actuator 262 from movement of the unsprung component 306. More particularly, the top mount 370 permits the suspension system 160 to pivot with little resistance (e.g., freely or with low resistance) in two rotational degrees of freedom (e.g., free or unrestricted degrees of freedom) about axes perpendicular to a longitudinal axis of the shaft 264. By providing little (e.g., low) resistance to pivoting in the two unrestricted degrees of freedom, the coupling between the suspension system 160 and the vehicle body 102 contributes little to the bending moment otherwise acting the suspension system 160. The top mount 370 may, as shown, be a cardan joint. Alternatively, the top mount 370 may be a ball-and-socket joint having an interference feature (e.g., protrusion in a slot), or be an isolator. As a result of the two free degrees of freedom, the suspension system 160 may pivot relative to the vehicle body 102 in a generally conical region, the peak of which is located generally at the top mount 370.

The top mount 370 may also restrict (e.g., preventing or with high resistance) pivoting in a third rotational degree of freedom (e.g., restricted degree of freedom) about the longitudinal axis (top-to-bottom across the page as shown). By providing high resistance (e.g., preventing movement) in the restricted degree of freedom, the suspension system is prevented from rotating as the actuator 262 is operated (e.g., when the motor is rotated).

Figure 4:
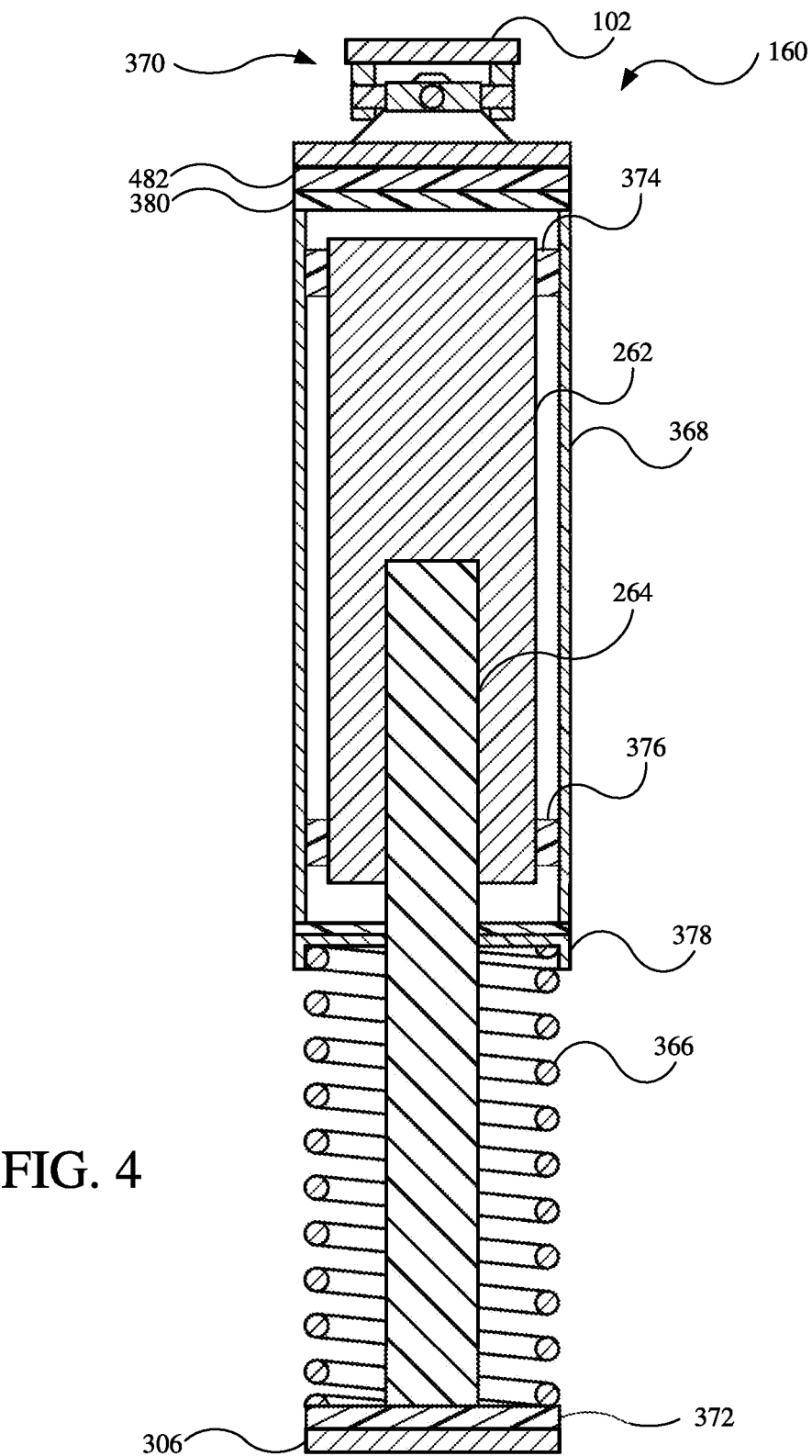
FIG. 4 is a cross-sectional schematic view of a variant of the suspension system of FIG. 3.

As shown schematically in FIG. 4, the suspension system 160 may additionally include a torsional isolator 482 (e.g., arranged between the housing 368 and the top mount 370, which dampens rotational loads not otherwise dampened by the other isolators (discussed in further detail below), for example, caused by rotation of the motor of the actuator 262.

As referenced above, the outer isolator 378 is arranged axially between the spring 366 and the housing 368 to transfer axial forces of the first load path therebetween. The preload (i.e., due to gravity acting on the vehicle) is transferred through the outer isolator, which as a result is configured to be substantially more stiff (e.g., has a higher restorative spring rate) in the axial direction than the upper inner isolator 374 and the lower inner isolator 376.

The suspension system 160 may additionally include one or more load sensors 380, which are configured to measure axial loading of the suspension system 160 to the vehicle body 102. The one or more load sensors 380 are, for example, arranged axially between the top mount 370 and the housing 368. The load sensors 380 may also be considered part of the sensing system 170 and be in communication with control system 180.

The control system 180, or a suspension control subsystem thereof, controls the actuator 262 to achieve desired force transfer between the wheel 104 and the vehicle body 102. As referenced above, the actuator 262 is configured to absorb external energy acting on the wheel 104 to, thereby, function as a damper as the wheel 104 moves both up and down relative to the vehicle body 102. Absorbing refers to taking energy out of the suspension system 160, for example, by converting and storing the mechanical energy as electrical energy (e.g., with the motor of the actuator 262 as a motor-generator). The actuator 262 is also configured to input energy to the wheel 104 to, thereby, cause the wheel 104 to move up and down relative to the vehicle body 102.

The control system 180 may, when operating the actuator 262 to achieve a desired axial force transfer between the vehicle body 102 and the wheel 104, adjust an input of the actuator 262 to account for axial compliance introduced by the upper inner isolator 374, the lower inner isolator 376, and, to a lesser extent, the outer isolator 378. For example, compressive states of the upper inner isolator 374, the lower inner isolator 376, and the outer isolator 378 may be accounted for using the load sensors 380 (e.g., based on known or tested spring rates). Based on different measurements by the load sensors 380 received at different times, the input to the actuator 262 (e.g., rotational speed and/or torque of the motor) may be different despite seeking the same output and response from the actuator 262 (i.e., axial force and/or displacement in a given timeframe). For example, assuming a cooperative spring rate of 1 kN/mm of the isolators and a preload of 5 kN (i.e., the first load path), an axial force measurement of 5 kN would represent a 0 kN axial load (i.e., via the second load path) and 0 mm of deflection of the isolators. Thus, to achieve a desired output force of 8 kN in the given time frame, 3 mm of compliance must be accounted for, for example, by initially rotating the motor at a relatively high rate of speed. An axial force measurement of 7 kN would represent a 2 kN axial load and 2 mm of deflection of the isolators. Thus, to achieve the same desired output force of 8 kN in the same given timeframe, 1 mm of compliance must be accounted for, for example, by initially rotating the motor at a relatively low rate of speed.

The suspension system 160 may additionally include position sensors 384 (e.g., displacement sensors), which measure deflection of the various isolators (e.g., by measure a change in position of the primary body 262a of the actuator 262 relative to the housing 368. This displacement information may be used, alone and/or in conjunction with the force information, to determine inputs to the actuator 262 (e.g., rotational speed and/or torque of the motor). For example, material properties of the various isolators may change with temperature and/or aging, which may be accounted for by measuring displacement of the isolators with the position sensors 384. For example, a measured displacement that does not correlate to an expected force value may be accounted for with the inputs to the actuator 262 to achieve a desired axial force or displacement output (e.g., using the example above, a 2 mm measured displacement would not correlate to a 6 kN measured force).

Figure 6A:
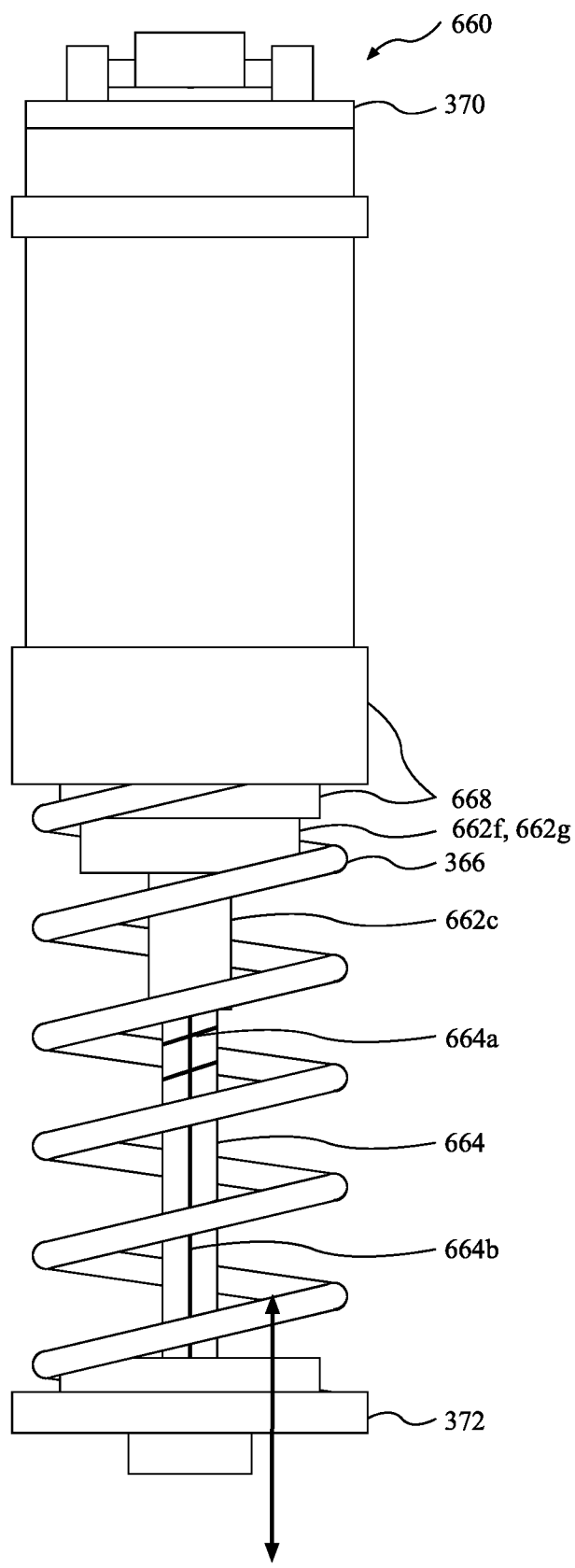
FIG. 6A is an elevation schematic view of a suspension system for use with the vehicle of FIG. 1.
Figure 6B:
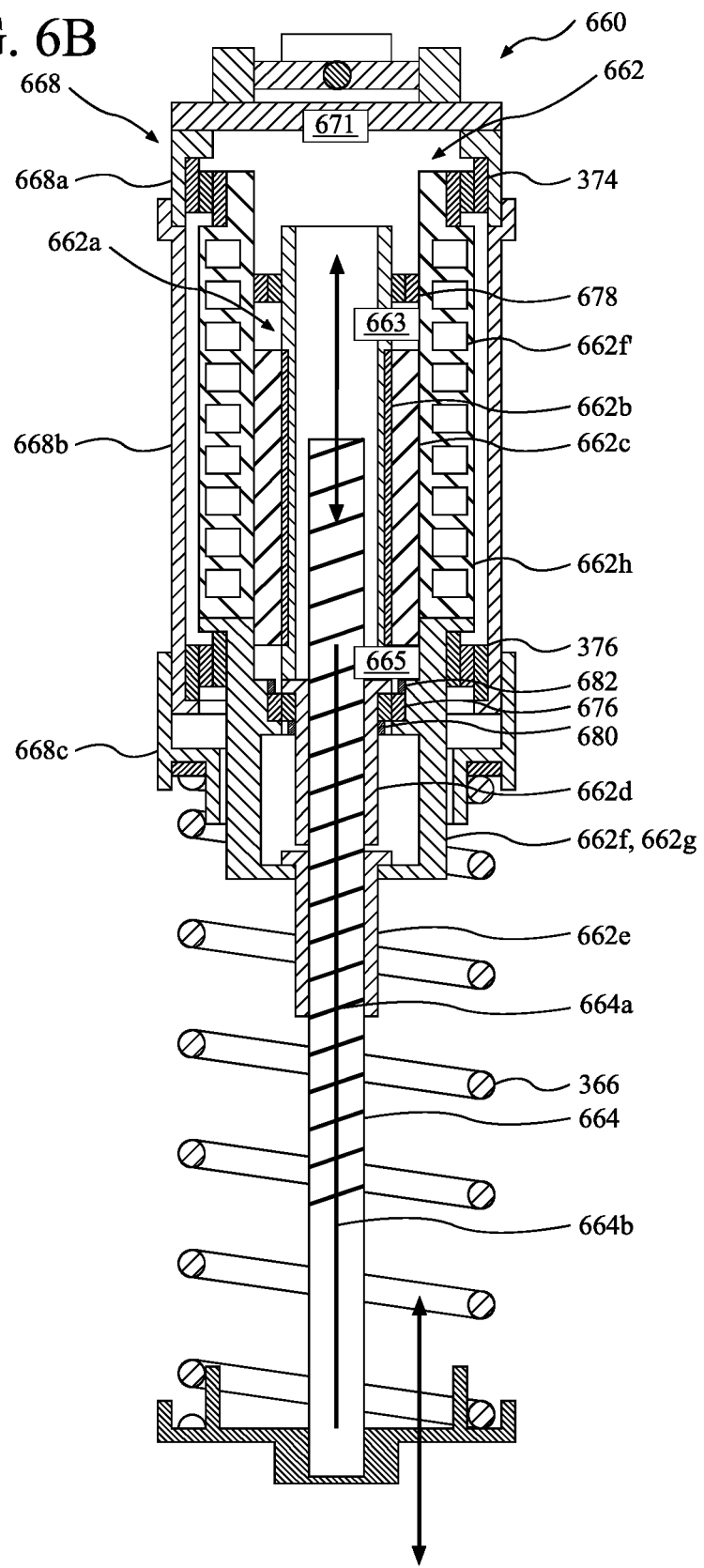
FIG. 6B is a cross-sectional view of the suspension system of FIG. 6A.

Referring to FIGS. 6A-6B, a suspension system 660 may be used as any of the suspension systems 160*fl*, 160*fr*, 160*rl*, 160*rr* shown in FIG. 1. The suspension system 660 is coupled at an upper end thereof to the vehicle body 102 and at a lower end thereof to the unsprung component 306. The suspension system 660 is configured similar to the suspension system 160 described previously. Where common reference numerals are used between the suspension system 660 and the suspension system 160 to identify components, features, or other elements of the suspension system 660, the discussion of the suspension system 160 may be referred to for further details of such components, features, or other elements. The suspension system 660 and the variations described below (e.g., suspensions systems 760, 860, 960, 1060, and 1160) may also be referred to as suspension assemblies or devices, or strut systems, assemblies, or devices.

The suspension system 660 generally includes an actuator 662, a shaft 664, the spring 366, and an outer housing 668, which may be used as the actuator 262, the shaft 264, the spring 366, and the housing 368, respectively, in the suspension system 160. The suspension system additionally includes the top mount 370 and the bottom mount 372.

As discussed above with reference to the suspension system 160, the suspension system 660 is configured to transfer force axially from the unsprung component 306 to the vehicle body 102 via two parallel load paths. The first load path is formed by the spring 366 and the outer housing 668, which carries the preload (e.g., a portion of the weight of the vehicle 100) and a portion of the dynamic load between the vehicle body 102 and the unsprung component 306. The second load path is formed by the actuator 662, the shaft 664, and the outer housing 668, which carry another portion of the dynamic load between the vehicle body 102 and the unsprung component 306, including providing primary damping functions for road disturbances.

Referring also to FIG. 6C, the actuator 662 is a linear actuator, which is configured as a ball-screw actuator or mechanism. The actuator 662 includes a motor 662a having a rotor 662b and a stator 662c, a ball nut 662d (e.g., a ball screw nut), a ball spline 662e (e.g., a ball spline nut), and an inner housing 662f having a lower inner housing portion 662g and an upper inner housing portion 662h. The shaft 664 extends through the actuator 662 and may be considered a part of the actuator 662. Broadly speaking, the motor 662a applies torque to the ball nut 662d relative to the outer housing 668 to control axial motion of the shaft 664 relative to the outer housing 668 and, thereby, control axial motion of the unsprung component 306 relative to the vehicle body 102. The ball spline 662e prevents rotation of the shaft 664 relative to the outer housing 668 to prevent transfer of torque from the motor 662a via the shaft 664 to the unsprung component 306 (e.g., a suspension arm) or other components (e.g., the steering linkage 254). The actuator 662 and the other actuators described herein may be configured as other types of linear actuators, such as a rack-and-pinion system, linear motor, or other suitable linear actuator. The inner housing 662f and the outer housing 668 may also be referred to as rigid housings. The lower inner housing portion 662g and the upper inner housing portion 662h may also be referred to as a lower housing structure and an upper housing structure, respectively.

Referring additionally to FIG. 6D, the rotor 662b and the ball nut 662d rotate in unison. The rotor 662b and the ball nut 662d may be considered to cooperatively form a rotating structure 662' of the actuator 662. The ball nut 662d and the rotor 662b may be coupled to each other at axial ends thereof. For example, the ball nut 662d and the rotor 662b may be coupled to each other with threaded fasteners (not shown) that extend axially through a radially-extending flange of the ball nut 662d into the axial end of the rotor 662b, such that torque generated by the motor 662a is transferred to the ball nut 662d. The rotor 662b and the ball nut 662d may be coupled to each other manners to transfer torque therebetween, for example, with a male-to-female interference fit therebetween. The rotor 662b may, for example, include magnets 662b' mounted to an outer radial surface of a spindle 662b" that is configured as a hollow shaft. The rotor 662b is hollow, so as to surround and rotate independent of the shaft 664, which translates axially therein. The rotating structure 662' may also be referred to as a rotating assembly.

Referring additionally to FIG. 6E, the stator 662c, the ball spline 662e, and the inner housing 662f are coupled to each other in a fixed manner to prevent rotational and axial movement therebetween. The stator 662c, the ball spline 662e, and the inner housing 662f may be considered to cooperatively form a stationary structure 662" of the actuator 662 relative to which the rotating structure 662' rotates. The lower inner housing portion 662g and the upper inner housing portion 662h of the inner housing 662f are rigid annular structures that are coupled to each other at axial ends thereof to prevent relative movement therebetween. For example, the lower inner housing portion 662g and the upper inner housing portion 662h may be coupled to each other with threaded fasteners (not shown) extending axially therein, or in another suitable manner (e.g., a male-to-female interference fit). Alternatively, the inner housing 662f may be a unitary structure that forms the inner housing, or may be formed of additional structures that form the inner housing 662f. The stator 662c is coupled inside the inner housing 662f to prevent relative movement therebetween, for example, being coupled to an inner surface of the upper inner housing portion 662h (e.g., being in contact therewith). As shown, the upper inner housing portion 662h may include cooling channels 662f' (e.g., cooling passages) through which a fluid may flow so as to cool the motor 662a (e.g., the stator 662c). The upper inner housing portion 662h may also be referred to as a stator housing or cooling jacket. The stationary structure 662" may also be referred to as a stationary assembly.

The ball spline 662e is coupled to the inner housing 662f to prevent relative rotational and axial movement therebetween, for example, being coupled to the lower inner housing portion 662g. As shown, the ball spline 662e and the lower inner housing portion 662g each include radially extending flanges that overlap each other radially. The flanges of the ball spline 662e and the lower inner housing portion 662g are coupled to each other, for example, with threaded fasteners (not shown) extending axially therein and which prevent axial and rotational movement therebetween. The ball spline 662e and the lower inner housing portion 662g may be coupled to each other in other manners to prevent axial and/or rotational movement relative to each other, such as with a male-to-female interference fit to prevent relative rotation and a snap ring or nut to prevent axial movement).

The rotating structure 662' (i.e., formed by the rotor 662b and the ball nut 662d) is configured to rotate relative to the stationary structure 662" (i.e., formed by the stator 662c, the ball spline 662e, the lower inner housing portion 662g, and the upper inner housing portion 662h), so as to apply axial force (i.e., the force of the second load path) between the stationary structure and the shaft 664. The axial force applied by the rotating structure 662' to the shaft 664 is to cause, restrict, prevent, or otherwise control axial movement of the shaft 664 relative to the actuator 662 to control force transmission in the second load path between the unsprung component 306 and the vehicle body 102.

More particularly, the motor 662a receives electrical current, which generates torque between the rotor 662b and the stator 662c. As torque is applied to the rotor 662b, torque is applied to the ball nut 662d, and axial force is applied from the ball nut 662d to the shaft 664. More particularly, the axial force is applied between the ball nut 662d and the shaft 664 via a first set of recirculating balls (not shown; such as ball bearings), as are known in the art of ball screw nuts. The recirculating balls engage an outer helical groove 664a in an outer surface of the shaft 664 and an inner helical groove 662d' corresponding thereto in an inner surface of the ball nut 662d, so as to apply the axial force between the ball nut 662d and the shaft 664 as torque is applied to the ball nut 662d. By controlling the torque applied by the motor 662a to the ball nut 662d (e.g., by controlling electrical power to the motor 662a), the axial force applied to the shaft 664 by the actuator 662 may be controlled, so as to cause, restrict, prevent, or otherwise control axial movement of the shaft 664 relative to the actuator 662. The actuator 662, thereby, may control transmission of force between the unsprung component 306 and the vehicle body 102, for example, to dissipate energy from road disturbances and/or to maintain contact of the wheels connected to the unsprung component 306 with a road surface therebeneath. For example, the actuator 662 may function as a damper. The ball nut 662d may also be referred to as a ball screw nut.

The stationary structure 662" is additionally configured to prevent rotation of the shaft 664 relative thereto. The torque applied by the motor 662a to the ball nut 662d, in addition to applying an axial force to the shaft 664, applies torque to the shaft 664 due to the inclination of the helical grooves 664a of the shaft 664 and the helical grooves 662d' of the ball nut 662d. The stationary structure 662" and, in particular, the ball spline 662e resists this torque applied to the shaft 664 by the motor 662a. As a result, torque is not transferred to the unsprung component 306 from the actuator 662, which might otherwise cause undesired lateral movement of the unsprung component 306 (e.g., if a control arm intended to pivot vertically relative to the vehicle body 102). Such lateral movement may, for example, induce wear on pivot joints and/or bushings by which the unsprung component 306 is mounted to the vehicle body 102 and/or may induce unwanted forces into the steering system 150.

The ball spline 662e engages the shaft 664 to prevent such torque from causing rotation of the shaft 664 relative to the actuator 662. More particularly, a second set of recirculating balls (not shown; such as ball bearings) engage an outer axial groove 664b in the outer surface of the shaft 664 and an inner axial groove 662e' of the ball spline 662e. For example, the shaft 664 may include two outer axial grooves 664b spaced 180 degrees apart, while the ball spline 662e includes two inner axial grooves 662e' spaced 180 degrees apart and corresponding thereto. Tangential force arising from the torque applied by the ball nut 662d to the shaft 664 is transferred via the second set of recirculating balls through the ball spline 662e, so as to prevent rotation of the shaft 664 relative to the stationary structure 662" of the actuator 662. As an alternative to the ball spline 662e, the shaft 664 may instead include key ways in which sliding or rolling keys ride and bear tangentially to transfer torque between the shaft 664 and the stationary structure 662" to prevent rotation therebetween.

The rotating structure 662' (i.e., the assembly of the rotor 662b and the ball nut 662d) is rotatably and axially supported by the stationary structure 662" (i.e., by the assembly of the stator 662c, the ball spline 662e, the lower inner housing portion 662g, and the upper inner housing portion 662h). For example, as shown, the rotating structure 662' is rotatably coupled to the stationary structure 662" with a lower bearing assembly 676 and an upper bearing assembly 678. Each of the lower bearing assembly 676 and the upper bearing assembly 678 prevent radial movement between the rotating structure 662' and the stationary structure 662". Each of the lower bearing assembly 676 and the upper bearing assembly 678 may be a ball, roller, or needle bearing assembly or similar having an inner race and an outer race that rotate relative to each other with roller elements therebetween (e.g., balls, roller, needles, or the like; not shown). One or both of the lower bearing assembly 676 and the upper bearing assembly 678 may additionally be configured to prevent axial movement between the rotating structure 662' and the stationary structure 662", for example, being configured as a thrust bearing. For example, as shown, the lower bearing assembly 676 may be a thrust bearing.

The lower bearing assembly 676 may be positioned radially between the ball nut 662d and the lower inner housing portion 662g. An inner race of the lower bearing assembly 676 is rotationally and axially fixed with the ball nut 662d, so as to rotate therewith, and may be considered part of the rotating structure 662'. For example, the inner race engages an outer radial surface of the ball nut 662d, so as to be rotationally and radially coupled thereto. The inner race is additionally held axially between an upper flange of the ball nut 662d, which extends radially outward of the outer radial surface thereof, and a nut 680 or other fastener (e.g., a snap or lock ring) engaged with the outer radial surface at an intermediate height of the ball nut 662d.

The outer race of the lower bearing assembly 676 is rotationally and axially fixed with the inner housing 662f, and may be considered part of the stationary structure 662". For example, the outer race engages an inner radial surface of the lower inner housing portion 662g, so as to be rotationally and radially coupled thereto. The outer race is additionally held axially between a flange of the lower inner housing 662f, which extends radially inward from the inner radial surface, and a snap ring 682 or other fastener (e.g., an externally threaded nut) engaged with the inner radial surface of the lower inner housing portion 662g.

The upper bearing assembly 678 may be positioned radially between the rotor 662b and the inner housing 662f. An inner race of the upper bearing assembly 678 is engaged with the outer radial surface of the spindle 662b" of the rotor (e.g., being press-fit thereto), so as to prevent radial and rotational movement therebetween. The inner race may be considered part of the rotating structure 662'. An outer race of the upper bearing assembly 678 is engaged with an inner radial surface of the upper inner housing portion 662h to prevent radial and rotational movement therebetween (e.g., being press-fit thereto), while allowing the inner race to move rotationally but not radially relative thereto. The outer race may be considered part of the stationary structure 662".

The lower bearing assembly 676 and the upper bearing assembly 678 are spaced apart axially, so as to resist any of the bending moments between the rotating structure 662' and the stationary structure 662" of the actuator 662. For example, the lower bearing assembly 676 may be positioned below the motor (e.g., below the magnets 662b' of the rotor 662b and the stator 662c) and resist radial loading between the rotating structure 662' and the stationary structure 662", such as between the ball nut 662d and the lower inner housing portion 662g, which may arise from the bending moment. The upper bearing assembly 678 may be positioned above the motor (e.g., above the magnets 662b' of the rotor 662b and the stator 662c) and resist radial loading between the rotor 662b (e.g., the spindle 662b" thereof) and the upper inner housing portion 662h, which may arise from the bending moment.

The ball nut 662d and the ball spline 662e are spaced apart axially, so as to resist any bending moments between the shaft 664 and the actuator 662. More particularly, as a result of the rotating structure 662' being fixed axially to the stationary structure 662" (e.g., via the lower bearing assembly 676 being configured as a thrust bearing), the ball nut 662d and the ball spline 662e are fixed axially relative to each other with the ball nut 662d being arranged above the ball spline 662e. As a bending moment is applied between the shaft 664 and the actuator 662, the ball nut 662d and the ball spline 662e apply radial force to the shaft 664 at different axial positions on the shaft 664 to resist the bending moment applied thereto.

As referenced above, the outer housing 668 transfers force in the first load path (i.e., with the spring 366) and the second load path (i.e., with the actuator 662 and the shaft 664) between the unsprung component 306 and the vehicle body 102. The outer housing 668 may, as shown, be configured as a multi-piece assembly. The outer housing 668 includes an upper outer housing 668a, an intermediate outer housing 668b, and a lower outer housing 668c, which are generally annular structures that surround portions of the actuator 662 and/or the shaft 664.

The upper outer housing 668a is coupled to the top mount 370 to transfer loading thereto. Various electronic circuitry and components (e.g., rotor encoder, position sensors, load cells; not shown) may be contained in a portion of an inner cavity of the outer housing 668, which is defined by the upper outer housing 668a. The upper inner isolator 374 may also be coupled to the upper outer housing 668a and the upper inner housing portion 662h (e.g., being positioned radially therebetween).

The intermediate outer housing 668b is coupled to (e.g., via threaded fasteners) and extends downward from the upper outer housing 668a. The intermediate outer housing 668b defines a main portion of the inner cavity of the outer housing 668, which generally contains the upper inner housing portion 662h and the motor 662a (i.e., the rotor 662b and the stator 662c). The lower inner isolator 376 may be coupled to the intermediate outer housing 668b and the lower inner housing portion 662g (e.g., being positioned radially therebetween).

The lower outer housing 668c is coupled to (e.g., via male-to-female threaded engagement) and extends downward from the intermediate outer housing 668b. The lower outer housing 668c defines a portion of the cavity of the outer housing 668, which contains portions of the lower inner housing portion 662g and the ball nut 662d, either of which may protrude axially below a bottom end of the lower outer housing 668c. The lower outer housing 668c may also function as a spring seat that receives the spring 366 therein and/or thereagainst (e.g., with an isolator therebetween) for transferring loading of the first load path thereto. The lower outer housing 668c may be axially adjustable relative to the intermediate outer housing 668b, for example, via the threaded engagement therebetween, so as to form an adjustable spring seat.

As referenced above and as shown, the actuator 662 is coupled to the outer housing 668 via the upper inner isolator 374 and the lower inner isolator 376, which may be configured to function as described previously for coupling and transferring loading between the actuator 262 and the housing 368. Each of the isolators may be tube isolators having inner and outer rigid ring members and an intermediate compliant ring member therebetween. The inner and outer ring members are, respectively coupled to the inner housing (e.g., to the lower inner housing portion 662g or the upper inner housing portion 662h) and the outer housing 668, while the intermediate compliant ring member provides compliance therebetween. The upper inner isolator 374 and the lower inner isolator 376 function to transfer axial loading of the second load path between the actuator 662 and the outer housing 668, while dampening vibrations or other disturbances generated by the actuator 662 (e.g., due to operation of the motor, movement of the recirculating balls within the ball nut 662d and the ball spline 662e, other friction) and/or vibrations or other disturbances arising external to the actuator (e.g., from road disturbances acting on the unsprung component 306). Additionally, the upper inner isolator 374 and the lower inner isolator 376 are spaced apart axially, so as to resist bending moment between the actuator 662 and the outer housing 668.

Figure 6F:
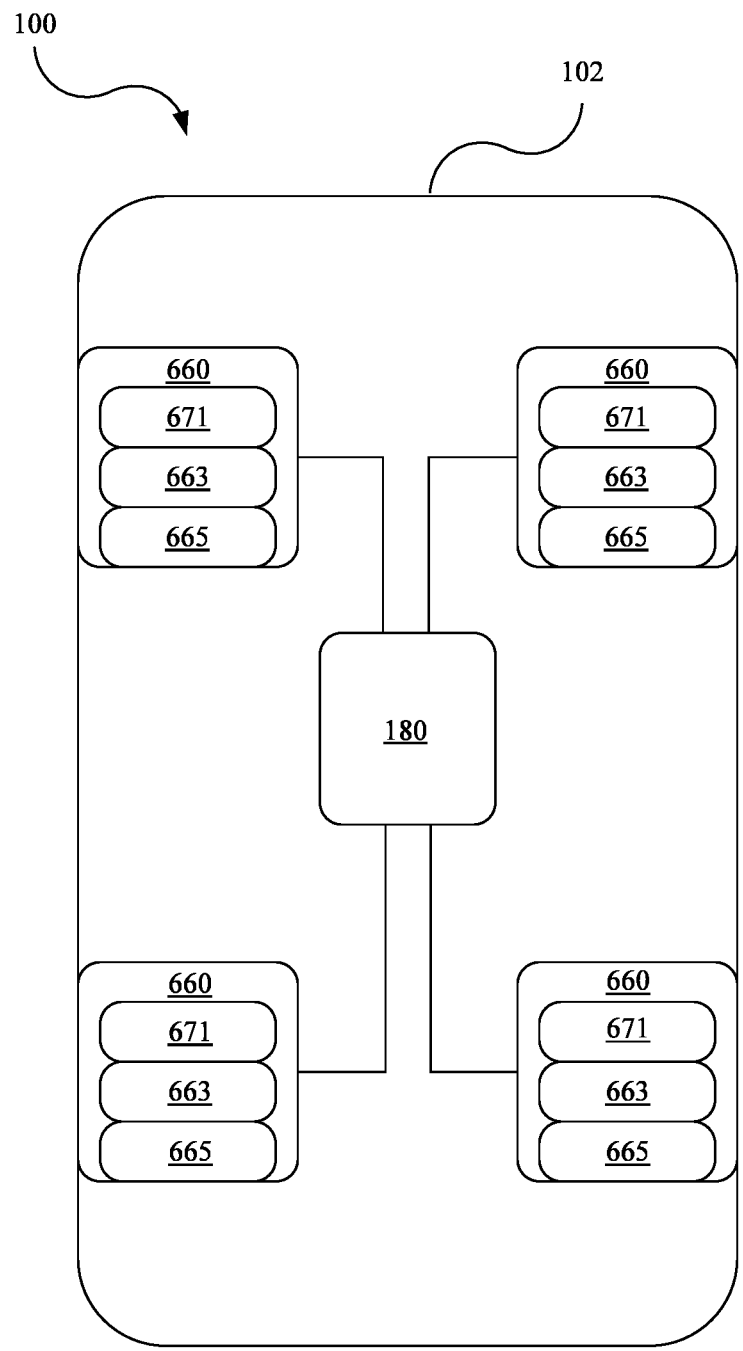
FIG. 6F is a schematic view of a vehicle comprising four of the suspension systems of FIG. 6A.

As shown in FIG. 6B, the suspension system 660 may also include various electronics, which are depicted schematically. These electronics are configured to monitor conditions of the suspension system 660 (e.g., force and displacement), which may be used for controlling the suspension system 660 and other systems of the vehicle 100. For example, the top mount 370 may include one or more force sensors 671, such as a load cell that measures force transferred between the housing 668 and the top mount (i.e., the forces of both the first load path and the second load path). The actuator 662 may include motor electronics 663, which may include various electronics for providing power to or drawing power from the motor 662 and controlling operation thereof (e.g., a rotor encoder). The actuator 662 may also include a position sensor 665 for measuring a position of the shaft 664 relative to the actuator 662 (e.g., for determining a length of the suspension system 660 or a height of the vehicle 100 (e.g., between the vehicle body 102 and the unsprung component). Referring to FIG. 6F, the electronics (i.e., the force sensors 671, the motor electronics 663, and the position sensor 665) may be in communication with the control system 180, which may provide control signals to each of the suspension systems 660 (e.g., four suspension systems 660) for control thereof.

Figure 7A:
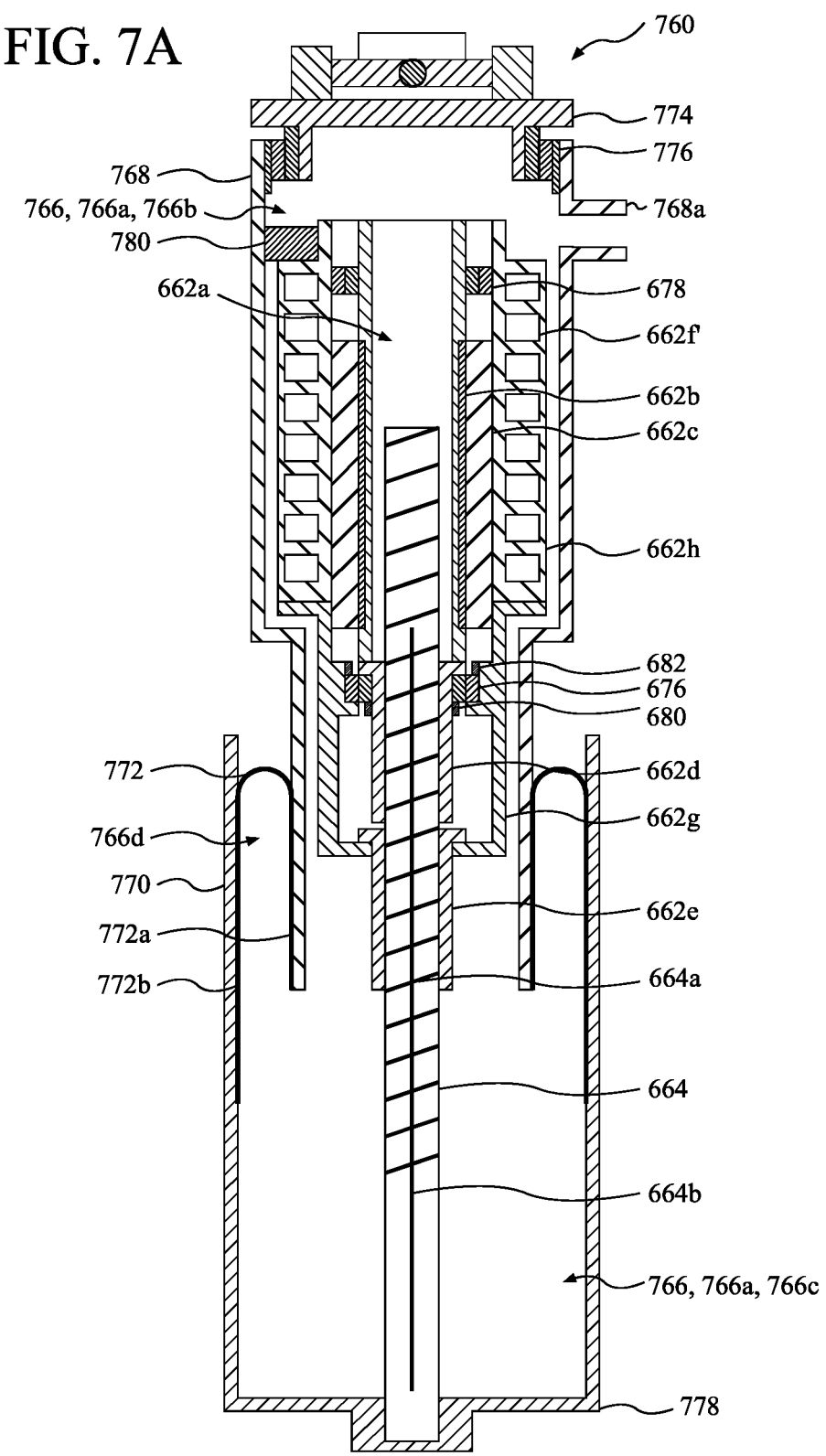
FIG. 7A is a cross-sectional schematic view of another suspension system for use in the vehicle of FIG. 1.
Figure 7B:
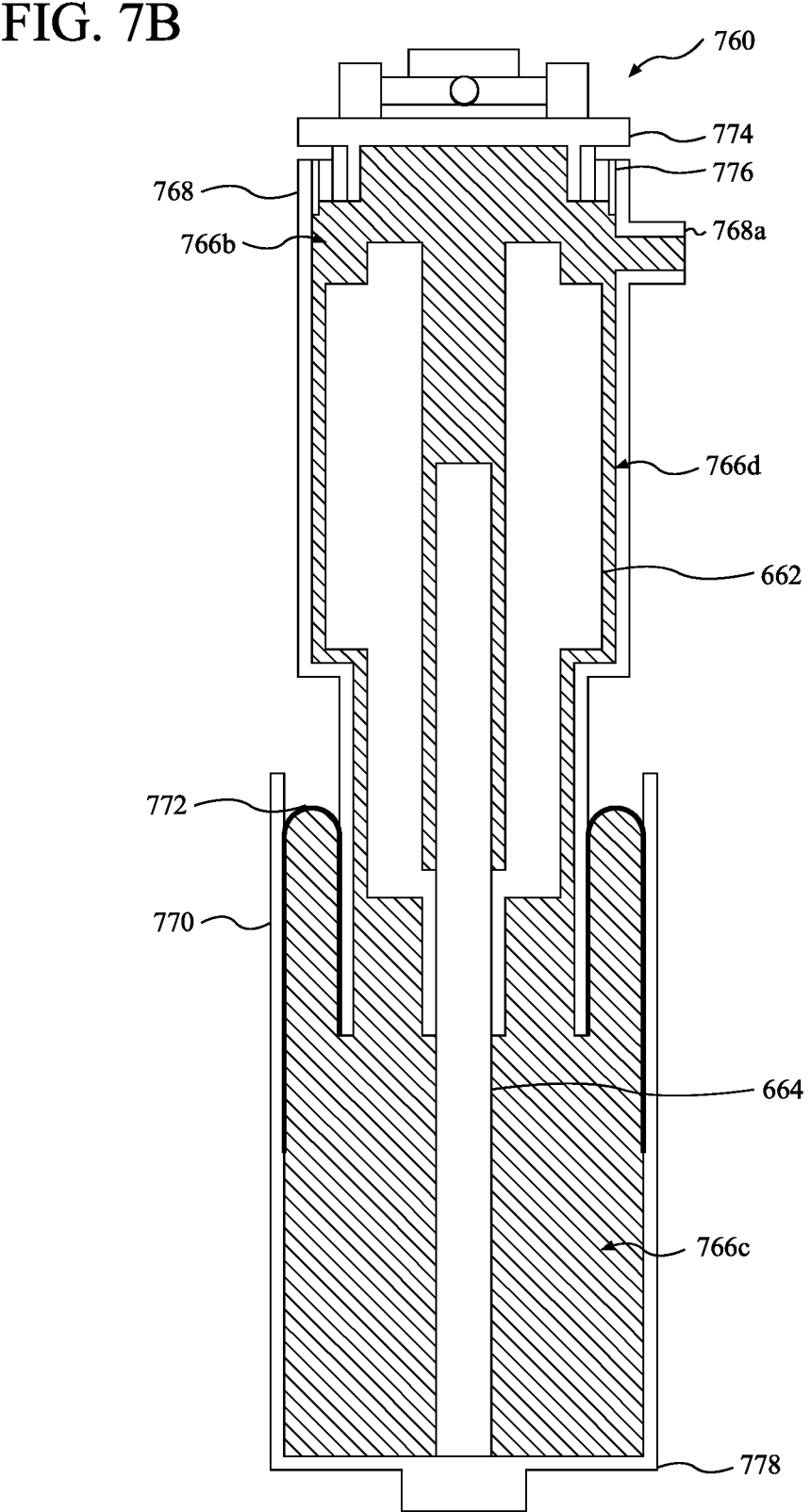
FIG. 7B is a cross-sectional schematic view of the suspension system of FIG. 7A with a pressurized cavity indicated in cross-hatching.

Referring to FIGS. 7A-7B, a suspension system 760, or strut assembly or system, may be used as any of the suspension systems 160fl, 160fr, 160rl, 160rr shown in FIG. 1. The suspension system 760 is coupled at an upper end thereof to the vehicle body 102 and at a lower end thereof to the unsprung component 306. The suspension system 760 is configured in some aspects similar to the suspension systems 160 and 660 described previously. Where common reference numerals are used between the suspension system 760 and the suspension systems 160 and 660 to identify components, features, or other elements of the suspension system 760, the discussion of the suspension systems 160 and 660 may be referred to for further details of such components, features, or other elements.

The suspension system 760 generally includes the actuator 662 and the shaft 664 and forms an air spring 766. As discussed in further detail below, the air spring 766 forms the first load path between the unsprung component 306 and the vehicle body 102, which is parallel to the second load path formed by the actuator 662, the shaft 664, and an upper housing 768. The air spring 766, as with the first load path, described previously, transfers the preload (i.e., the weight of the vehicle 100) between the unsprung component 306 and the vehicle body 102. The actuator 662 and the shaft 664 may be configured substantially as described previously to form the second load path between the unsprung component 306 and the vehicle body 102.

The suspension system 760 includes components of the actuator 662, the shaft 664, the upper housing 768, a lower housing 770, and a membrane 772, as well as a top mount 774, and a bottom mount 778.

The upper housing 768 is a generally rigid and annular structure, which extends downward from the top mount 774 to surround all or a portion of the actuator 662. As discussed in further detail below, the upper housing 768 may define an upper chamber 766b of a pressurized cavity 766a of the air spring 766. The upper housing 768 is coupled to the top mount 774 and extends downward therefrom to terminate at a bottom end thereof positioned below the ball nut 662d, for example, at least partially overlapping the ball spline 662e. The upper housing 768 may also reduce in diameter moving downward from the top mount 774, for example, reducing in diameter in a stepped or gradual manner below the stator 662c of the motor 662a. The upper housing 768 may, as shown, be a unitary component but may be formed as an assembly of multiple components (e.g., similar to the upper outer housing 668a and the intermediate outer housing 668b).

The upper housing 768 additionally includes a port 768a by which the air spring 766 receives pressurized gas (e.g., pressurize air) from an air source (not shown) to increase the amount of air in the pressurized cavity 766a to raise the vehicle 100. Air may also be released from the air spring 766 through the port 768a to lessen the amount of air in the pressurized cavity 766a to lower the vehicle 100.

The upper housing 768 is coupled to the top mount 774 with an isolator 776, which forms a compliant coupling therebetween, while limiting rotational, radial, and axial movement therebetween. The isolator 776 may, for example, be a tube isolator having rigid inner and outer ring members coupled to and separated by a compliant intermediate ring member. The isolator 776 may be positioned radially between and be rigidly coupled to an inner radial portion of the upper housing 768 (e.g., an inner surface thereof) and an outer radial portion of the top mount 774 (e.g., a downward extending annular flange thereof). The isolator 776 transfers force of the second load path between the upper housing 768 and the top mount 774. The isolator 776 additionally functions to seal the upper housing 768 to the top mount 774, so as to seal the pressurized cavity 766a with the top mount 774.

The top mount 774 is a structure that functions to both seal the pressurized cavity 766a and mechanically connect the suspension system 760 the vehicle body 102. The top mount 774 may include one or more structures and/or components that are coupled to each other to form the top mount 774 as an assembly. For example, the top mount 774 may include, among other components, a lower structure that functions, in part, to seal the pressurized cavity 766a and an upper structure that functions to couple the suspension system 760 to the vehicle body 102. The top mount 774 may include further components and/or functions, such as including a load cell, which measures force transfer between the suspension system 760 and the vehicle body 102.

The lower housing 770 is generally rigid and annular structure, which is coupled to and extends upward from a bottom mount 778 to terminate at an upper end thereof. As the vehicle body 102 and the unsprung component 306 and, thereby, the top mount 774 and the bottom mount 778 move toward and away from each other, the upper end of the lower housing 770 changes axial position relative to the lower end of the upper housing 768. In some positions, the lower housing 770 axially overlaps the upper housing 768. The upper end of the lower housing 770 has a larger diameter than the lower end of the upper housing 768, such that the upper housing 768 may be received within the lower housing 770. A circumferential gap 766d is defined between the upper end of the lower housing 770 and the lower end of the upper housing 768. The lower housing 770 may be formed, as shown, as a unitary component formed integrally with a portion of the bottom mount 778, or may be formed as an assembly of multiple components (e.g., being formed separately from and coupled to the bottom mount 778).

The bottom mount 778 is a structure that functions to both seal the pressurized cavity 766a and mechanically connect the suspension system 760 the unsprung component 306. The bottom mount 778 may include one or more structures and/or components that are coupled to each other to form the bottom mount 778 as an assembly. For example, the bottom mount 778 may include, among other components, an upper structure that functions, in part, to seal the pressurized cavity 766a and connect to the shaft 664, and include a lower structure that functions to couple the suspension system 760 to the unsprung component 306. The shaft 664 is coupled to the bottom mount 778 for transferring force of the second load path therebetween.

The membrane 772 extends radially between the upper end of the lower housing 770 and the lower end of the upper housing 768 to seal the circumferential gap 766d therebetween. The membrane 772 thereby seals the pressurized cavity 766a. The membrane 772 may be formed of a polymeric (e.g., rubber) material or any other suitable flexible material.

The membrane 772 is configured to form the air spring 766 as a rolling lobe air spring as is understood in the art. The membrane 772 includes an inner membrane portion 772a coupled to the lower end of the upper housing 768 and an outer membrane portion 772b coupled to the upper end of the lower housing 770. As the vehicle body 102 and the unsprung component 306 and, thereby, the upper housing 768 and the lower housing 770 move toward and away from each other, the inner membrane portion 772a and the outer membrane portion 772b translate axially relative to each other.

The actuator 662 is coupled to the upper housing 768 to prevent rotational and axial movement therebetween. For example, the actuator may be coupled to the upper housing 768 with one or more support structures 780 that extend radially between the actuator 662 and the upper housing 768. The one or more support structures 780 may, for example, couple the upper inner housing portion 662h to the upper housing 768. The support structures 780 may be positioned above the motor 662a (e.g., above the stator 662c and/or the upper bearing assembly 678). The one or more support structures 780 additionally allow air flow between an upper chamber 766b and a lower chamber 766c of the pressurized cavity 766a as discussed in further detail below (e.g., being configured as spokes). As a result, forces of the second load path are transferred between the actuator 662 and the upper housing 768 with the support structures 780. Thus, the second load path transfers force between the unsprung component 306 to the vehicle body 102 from the bottom mount 778 to the shaft 664 to the actuator 662 to the upper housing 768 to the isolator 776 and to the top mount 774.

As referenced above, the air spring 766 forms the first load path between vehicle body 102 and the unsprung component 306, while the actuator 662, the shaft 664, and the upper housing 768 form the second load path in parallel to the first load path. Referring first to the first load path, the air spring 766 includes the pressurized cavity 766a, which is a sealed chamber containing pressurized gas or air. The cavity 766a is generally defined by the upper housing 768, the lower housing 770, and the membrane 772 sealed therebetween. The cavity 766a may also extend from the top mount 774 to the bottom mount 778, and may be defined therebetween. Force of the first load path is transferred by the pressurized gas acting on an upper end and a lower end of the pressurized cavity 766a, for example, formed by the top mount 774 and the bottom mount 778, respectively. Referring to FIG. 7B, the pressurized cavity 766a is represented by the area shown in cross-hatching. As discussed in further detail below, the actuator 662 and the shaft 664 are contained in the pressurized cavity 766a, so as to be subject to the air pressure therein.

As the vehicle body 102 and the unsprung component 306 move relative to each other, the volume of the pressurized cavity 766a changes to further compress or decompress a given amount of air therein, such that the suspension system 760 exerts more or less force, respectively, between the vehicle body 102 and the unsprung component 306. Further, for a given pressure, air may be selectively added to or removed from the pressurized cavity 766a, so as to increase the volume of the pressurized cavity 766a and, thereby, change a length of the suspension system 760 and a distance between the vehicle body 102 and the unsprung component 306. As the length of the suspension system changes (e.g., from different forces applied between the vehicle body 102 and the unsprung component, from forces applied by the actuator 662 between the bottom mount 778 and the top mount 774, and/or as air is added to or removed from the cavity 666a), the upper housing 768 and the lower housing 770 move axially relative to each other, for example, with the upper housing 768 being received and/or sliding within the lower housing 770.

As referenced above, the pressurized cavity 766a includes the upper chamber 766b and the lower chamber 766c, which are in fluidic communication with each other. The upper chamber 766b is generally defined by the upper housing 768. The lower chamber 766c is generally defined by the lower housing 770 and the membrane 772. The actuator 662 and the upper housing 768 generally form an assembly (e.g., a first piston assembly of the air spring 766) that is movable relative to the bottom mount 778, which is permitted or allowed to move due to the membrane 772 being flexible. The top mount 774 generally forms another assembly (e.g., a second piston assembly of the air spring 766) that is movable relative to the housing 768, which is permitted or allowed to move due to the isolator 776 having compliance. The first piston assembly and the second piston assembly may have effective piston areas that are approximately equal, for example, being defined generally as the areas within, respectively, a mid-point between the inner housing 662g and the lower housing 770 (e.g., a mid-point of the flexible membrane) and within a mid-point of the intermediate compliant ring of the isolator 776. By having effective piston areas that are approximately equal may allow for an axial static load on the actuator 662 to be approximately zero (e.g., from the common pressure in the upper chamber 776b and the lower chamber 766c applying approximately equal upward and downward forces to the first piston assembly that includes the actuator 662. The effective piston areas may be approximately equal by, for example, being within 25%, 15%, 10%, 5%, or 2% of each other. Approximate equal piston areas may be applied to the further suspension systems 860, 960, 1060, and 1160 described below.

The upper chamber 766b and the lower chamber 766c are in fluidic communication with each other, so as to maintain a generally even pressure therein. As shown in FIGS. 7A and 7B, a circumferential gap 766d (e.g., an annular plenum) extends between the upper chamber 776b and the lower chamber 766c, so as to maintain fluidic communication therebetween. The circumferential gap 766d, for example, is defined radially between the upper housing 768 and the inner housing 662f of the actuator 662, and circumferentially around an axis of the shaft 664. Further, as referenced above, the one or more support structures 780, which couple the actuator 662 to the upper housing 768, allow air flow between the upper chamber 776b and the lower chamber 766c through the circumferential gap 766d. For example, the support structures 780 may be spokes that are circumferentially spaced apart from each other to provide flow paths therebetween.

As the suspension system 760 changes in length, the volume of the pressurized cavity 766a changes and, in particular, the volume of the lower chamber 766c changes, while the volume of the upper chamber 766b stays generally constant. Thus, as the volume of the pressurized cavity 766a increases or decreases for a given amount of air, the air flows, respectively, from the lower chamber 766c to the upper chamber 766b, or from the lower chamber 766c to the upper chamber 766b, to maintain generally even air pressure therebetween. It should be noted, however, that pressure slight variances between the upper chamber 766b and the lower chamber 766c may occur as the air flows therebetween and is restricted within the circumferential gap 766d.

Referring to the second load path, the second load path is formed by the actuator 662, the shaft 664, and the upper housing 768 and is in parallel to the first load path between the top mount 774 and the bottom mount 778 and, thereby, between the vehicle body 102 and the unsprung component 306. More particularly, force is transferred between the top mount 774 and the upper housing 768 via the isolator 776, between upper housing 768 and the actuator 662 via the support structures 780, and between the actuator 662 (i.e., the ball nut 662d thereof) and the bottom mount 778 via the shaft 664.

As mentioned above, the first load path supports the weight of the vehicle body 102 on the unsprung component 306, as well as a portion of the dynamic loading to the vehicle body 102 (e.g., from weight transfer as the vehicle 100 goes around a corner or accelerates, or as masses move within the vehicle 100) or dynamic loading to the unsprung component 306 (e.g., as a wheel goes over a bump or through a pothole). The force in the first load path is generally a function of a spring constant of the air spring 766 and the length (e.g., displacement) of the suspension system 760 (e.g., the distance between the vehicle body 102 and the unsprung component 306). The spring constant of the air spring 766 may be controlled with addition or removal of air from the pressurized cavity 766a, but may be controlled in a relatively small range (e.g., +/−20%) and at a relatively low speed (e.g., bandwidth) that is limited by the rate of air supply to or release from the pressurized cavity 766a.

The second load path is configured control force transfer between the vehicle body 102 and the unsprung component 306 due to the dynamic loading, for example, functioning as a damper. The force in the second load path is controlled directly by the actuator 662 (i.e., by the motor 662a applying a torque to the ball nut 662d that in turn applies an axial force to the shaft 664), which may be controlled in a large range (e.g., 0 kN +/−a force capacity) and at a relatively high speed (e.g., bandwidth), as compared to first load path by the air spring 766. As a result, the actuator 662 may be operated to selectively apply axial force to the shaft 664 (i.e., by selectively applying torque from the motor 662a to the ball nut 662d) to control force transmission from the unsprung component 306 to the vehicle body 102 in response to or anticipation of dynamic loading (e.g., in response to or in anticipation of road disturbances), while the air spring 766 may or may not be controlled in response to or in anticipation of dynamic loading.

As referenced above, the pressurized cavity 766a of the air spring 766 extends from an upper end to a lower end of the suspension system 760 (e.g., between the top mount 774 and the bottom mount 778), and may also contain a least a portion of the actuator 662 (e.g., one, or more, or all of the motor 662a, including both the rotor 662b and the stator 662c, the ball nut 662d, and the ball spline 662e) and the shaft 664. Various advantages may be offered by this configuration, as opposed to an air spring instead being arranged entirely below the actuator 662. For example, the usable volume of the pressurized cavity 766a may be larger and/or allow for narrower packaging of the air spring 766, as compared to an air spring mounted below the actuator 662. Additionally, an air spring mounted below the actuator 662 might otherwise need to be sealed to and move along the shaft 664, which may be difficult to perform given the grooves 664a, 664b in the outer surface thereof. Still further, the actuator 662 is protected from the outside environment by being located in the pressurized cavity 766a without the need for a protective shroud (e.g., a bellows).

Figure 7C:
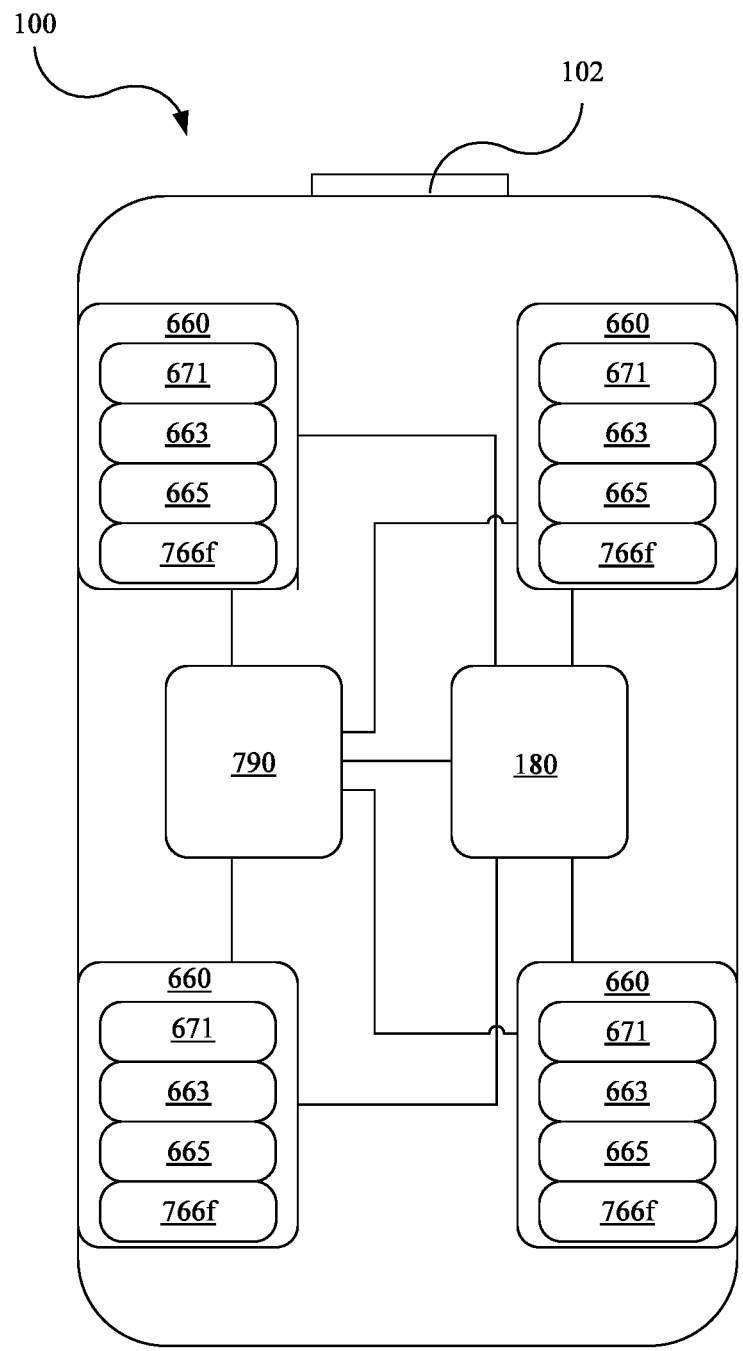
FIG. 7C is a schematic view of a vehicle comprising four of the suspension systems of FIG. 7A and a pressurized air source.

As shown in FIG. 7A, the suspension system 760 may also include various electronics, which are depicted schematically. These electronics may include the force sensors 671 described previously and incorporated into the top mount 771, the motor electronics 663, and the position sensor 665, and may also include a pressure sensor 766f. Such electronics may also be included in the suspension systems 860, 960, 1060, and 1160 described below. Referring to FIG. 7C, the electronics (i.e., the force sensors 671, the motor electronics 663, the position sensor 665, and the pressure sensor 766f) may be in communication with the control system 180, which may provide control signals to each of the suspension systems 660 (e.g., four suspension systems 660) for control thereof. The vehicle may additionally include pressurized gas source 790, which is in fluidic communication with each of the suspension systems 760 of the vehicle 100 (e.g., four) and which may be controlled by the control system 180 for supplying or releasing pressurized air from the air springs 766 of each of the suspension systems 760.

Figure 8B:
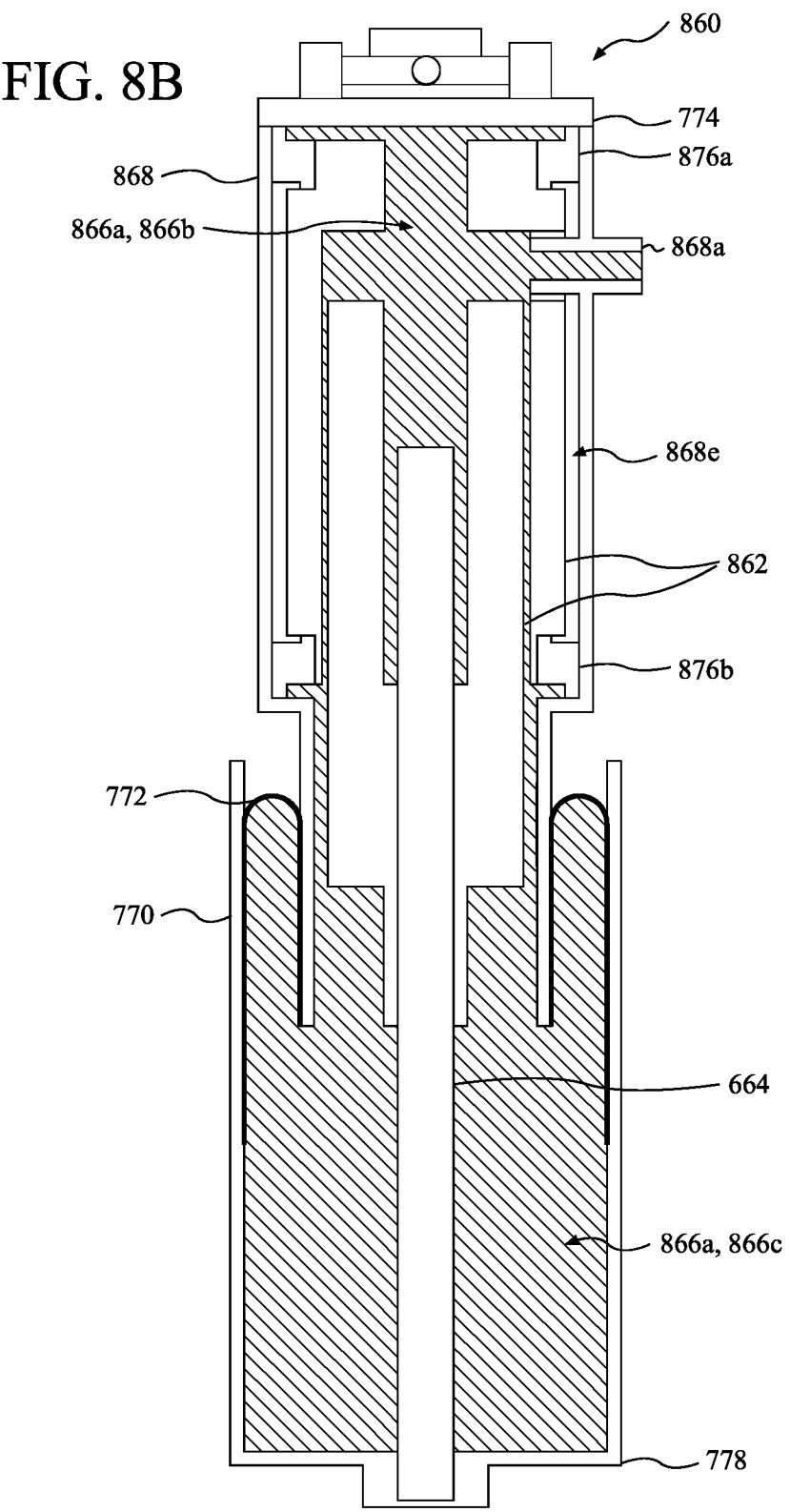
FIG. 8B is a cross-sectional schematic view of the suspension system of FIG. 8A with a pressurized cavity indicated in cross-hatching.

Referring to FIGS. 8A-8B, a suspension system 860 is a variation of the suspension system 760. The suspension system 860 generally includes an actuator 862, the shaft 664, an air spring 866 having a pressurized cavity 866a, an upper housing 868, the lower housing 770, and the membrane 772. The air spring 866 forms the first load path between the top mount 774 and the bottom mount 778. The actuator 862 and the shaft 664 form the second load path between the top mount 774 and the bottom mount 778, and the load path may also include the upper housing 868.

The actuator 862 is configured similar to the actuator 662 (e.g., by including the motor 662a, the ball nut 662d, the ball spline 662e, and the inner housing 662f) with variations for mounting to the upper housing 868 and for communicating air between an upper chamber 866b and a lower chamber 866c of the pressurized cavity 866a. The shaft 664 is configured as describe previously. The air spring 866 is configured similar to the actuator 662 (e.g., by being defined by the upper housing 868, the lower housing 770, and the membrane 772) with variations to the configuration of the upper chamber 866b of the pressurized cavity 866a and in communicating air between the upper chamber 866b and the lower chamber 866c. The upper housing 868 is configured similar to the upper housing 768 with variations for mounting the actuator 862 thereto, in defining the upper chamber 866b, and in connecting to the top mount 774. The lower housing 770 and the membrane 772 are configured as described previously. These variations are described in further detail below.

The actuator 862 is mounted to the upper housing 868 and/or to the top mount 774 with an upper isolator 876a and a lower isolator 876b. Each of the upper isolator 876a and the lower isolator 876b are configured similar to the isolator 776 described previously by including inner and outer rigid rings between which is an intermediate compliant ring. The upper isolator 876a is positioned radially between and is rigidly coupled to the upper housing 868 and/or the top mount 774 and to the actuator 862. For example, the outer rigid ring of the upper isolator 776a may be rigidly coupled to an inner surface of the upper housing 868 and/or to the top mount 774a, while the inner rigid ring of the upper isolator 776a may be rigidly coupled to an outer radial surface of the inner housing 662f, such as to the upper inner housing portion 662h). The upper isolator 876a is positioned axially above the motor 662a, such as above the stator 662c and/or the rotor 662b).

The lower isolator 876b is positioned radially between and is rigidly coupled to the upper housing 868 and to the actuator 862. For example, the outer rigid ring of the lower isolator 876b may be rigidly coupled to an inner radial surface of the upper housing 868, while the inner rigid ring of the lower isolator 876b may be rigidly coupled to an outer radial surface of the inner housing 662f, such as to the lower inner housing portion 662g. The lower isolator 876b is spaced axially apart from the upper isolator 876a. For example, the lower isolator 876b is positioned below a majority of an axial length of the motor 662a (e.g., below a majority of the stator 662c), such as being coupled to the lower inner housing portion 662g. By being spaced apart axially, the upper isolator 876a and the lower isolator 876b cooperatively resist a bending moment applied to the suspension system 860, for example, between the actuator 862a and the upper housing 868.

The actuator 862 is additionally configured to allow air to flow therethrough between the upper chamber 866b and the lower chamber 866c of the pressurized cavity 866a of the air spring 866. Referring to FIG. 8B, the pressurized cavity 866a, which is represented by cross-hatching, extends axially through the actuator 862a. Air communicates between the upper chamber 866b and the lower chamber 866c through the actuator, such as through axial channels in the inner housing 662f, channels and/or gaps between the inner housing 662f and the stator 662c, and/or between the rotor 662b and the stator 662c, such channels and/or gaps being illustrated schematically in FIG. 8B.

The cavity 866a is generally defined by the actuator 862 (e.g., the inner housing 662f thereof), the upper housing 868, the lower housing 770, the membrane 772, as well as between the top mount 774 and the bottom mount 778. The upper chamber 866b of the cavity is generally positioned within the upper housing 868, but is not defined or formed thereby, and is instead defined or formed by the inner housing 662f of the actuator 862, such that the upper housing 868 is isolated from the upper chamber 866b (e.g., is not in fluidic communication therewith or under pressure). As shown, the upper isolator 876a and the lower isolator 876b form a seal between the actuator 862 (e.g., the inner housing 662f thereof) and the upper housing 868, such that an annular cavity 868e defined radially between the actuator 862 and the upper housing 868 and axially between the upper isolator 876a and the lower isolator 876b is not in fluidic communication with the pressurized cavity 866a (e.g., the upper chamber 866b or otherwise) of the air spring 866. As a result, an upper portion of the upper housing 868 is not subject to the air pressure within the pressurized cavity 866a.

The upper housing 868 may be rigidly coupled to the top mount 774. For example, the upper housing 868 may be coupled directly to the upper housing 868 and/or to the outer rigid ring of the isolator 776 that is in turn rigidly coupled to the top mount 774.

A port 868a may be a variation of the port 768a and be configured to communicate air to and from the upper chamber 866b without communicating air to the region between sealed and unpressurized region between the upper housing 868 and the inner housing 662f of the actuator 662.

The suspension system 860 achieves various advantages of the suspension system 760. For example, the pressurized cavity 866a of the air spring 866 extends from an upper end to a lower end of the suspension system 860 (e.g., between the top mount 774 and the bottom mount 778), so as to provide a relatively large volume and/or narrow packaging as compared to an air spring instead mounted below the actuator 662. The actuator 862, by being contained within upper housing 868 is protected from the outside environment, while the motor 662a (e.g., the rotor 662b and the stator 662c) subject to the air pressure of the pressurized cavity 866a). Further, by containing the shaft 664 within the pressurized cavity 866a, a moving seal does not need to be formed therewith, which may be difficult to perform reliably with the grooves 664a, 664b thereon.

As referenced above, the first load path is formed by the air spring 866, whereby pressurized gas in the cavity 866a transfers force of the first load path between the top mount 774 and the bottom mount 778. The second load path is in parallel to the first load path and is formed by the actuator 862, whereby force of the second load path is transferred between the top mount 774 and the bottom mount 778 by the shaft 664, the ball nut 662d, the inner housing 662f of the actuator 662, the isolators 876a, 876b (e.g., by the compliant intermediate ring thereof), and the housing 868. The housing 868 may function to both define the pressurized cavity 866a, while also transferring force of the second load path. The isolator 876a may function to both seal the pressurized cavity 866a of the air spring 866, while also transferring force of the second load path. The pressurized cavity 866a may be cooperatively defined by the top mount 774, the isolator 776, the housing 868, the flexible membrane 772, and the bottom mount 778, and may be further defined by the lower housing 770.

Refer to the discussions above of the suspension systems 160, 660, 760 for further description of other parts and features of the suspension system 860, including those identified in FIGS. 8A-8B.

Figure 9:
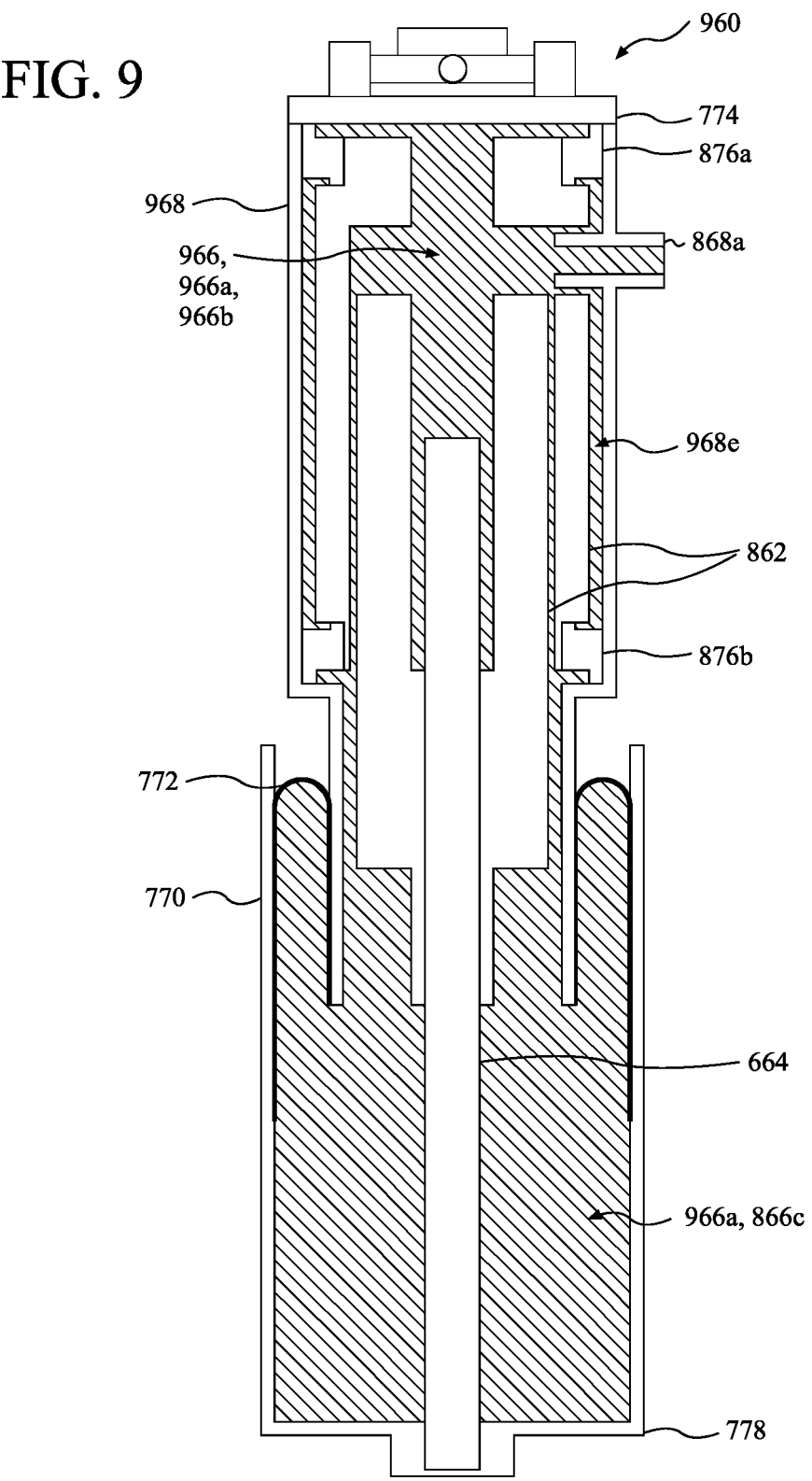
FIG. 9 is a cross-sectional schematic view of a variation of the suspension system of FIG. 8A with a pressurized cavity indicated in cross-hatching.

Referring to FIG. 9, a suspension system 960 is a variation of the suspension system 860. The suspension system 860 generally includes the actuator 862, the shaft 664, an air spring 966 having the pressurized cavity 966a, an upper housing 968, the lower housing 770, and the membrane 772. The air spring 966 forms the first load path between the top mount 774 and the bottom mount 778. The actuator 862 and the shaft 664 form the second load path between the top mount 774 and the bottom mount 778, and the load path also includes the upper housing 968.

The suspension system 960 differs from the suspension system 860 in that an annular cavity 968e, which is defined radially between the upper housing 968 and the actuator 862 (similar to the annular cavity 868e), is in communication with an upper chamber 966b of the cavity. As a result, the pressurized cavity 966a of the air spring 966 is defined or otherwise formed by the upper housing 968, which retains the air pressure within the pressurized cavity 966a. The actuator 862 and, in particular, the inner housing 662f thereof does not seal the pressurized cavity 866a, but is still contained within the pressurized cavity 866a and subject to the pressure therein.

Refer to the descriptions above of the suspension systems 160, 660, 760, 860 for further description of other parts and features of the suspension system 960, including those identified in FIG. 9.

Figure 10:
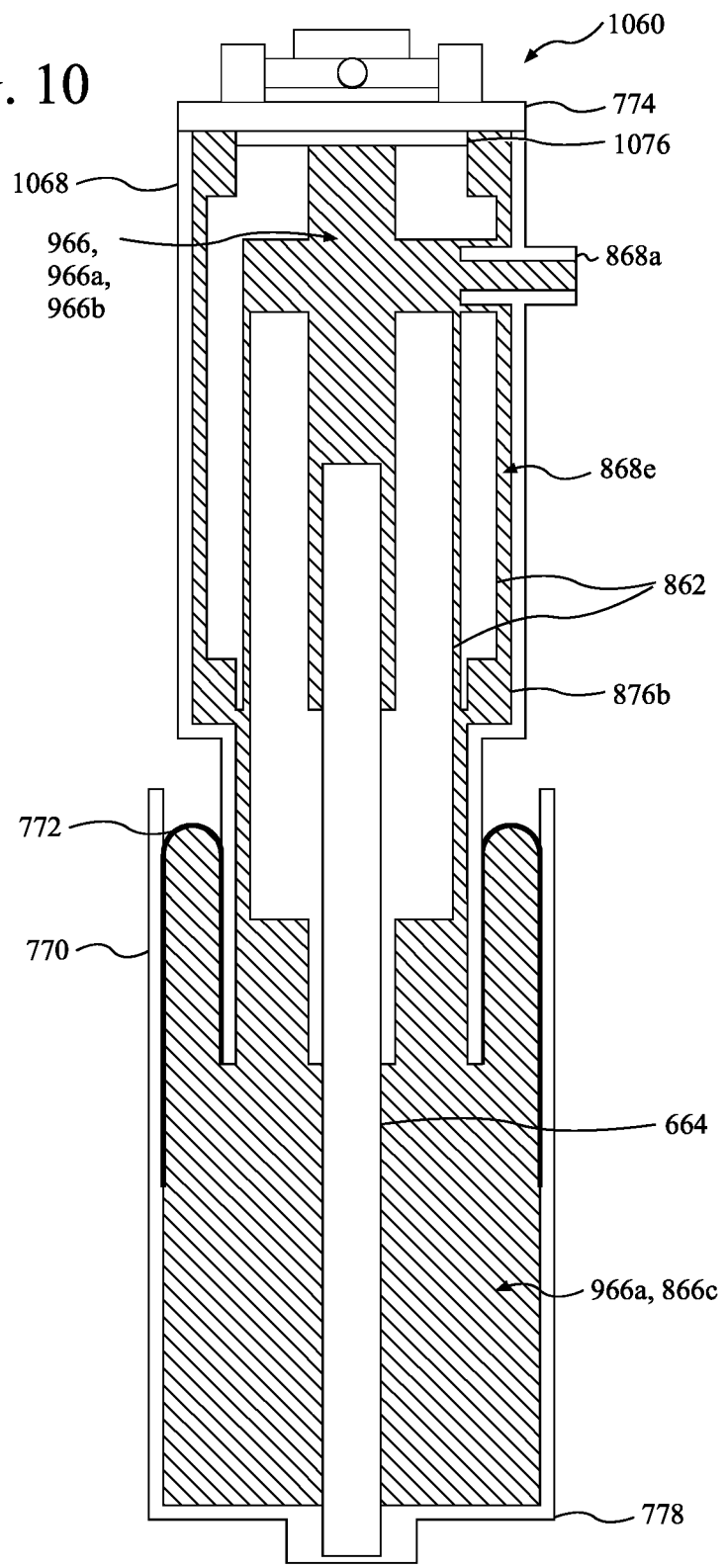
FIG. 10 is a cross-sectional schematic view of another variation of the suspension system of FIG. 8A with a pressurized cavity indicated in cross-hatching.

Referring to FIG. 10, a suspension system 1060 is a variation of the suspension system 960. The suspension system 1060 generally includes the actuator 862 (or may alternatively include the actuator 662), the shaft 664, the air spring 966 having the pressurized cavity 966a, an upper housing 1068, the lower housing 770, and the membrane 772. The air spring 966 forms the first load path between the top mount 774 and the bottom mount 778. The actuator 862 and the shaft 664 form the second load path between the top mount 774 and the bottom mount 778, and the load path may also include the upper housing 868.

The suspension system 1060 differs from the suspension systems 760, 860, 960 in that the upper housing 1068 does not form part of the second load path from the actuator 862 to the top mount 774. The upper isolator 876a and the lower isolator 876b are omitted. Rather, an upper end of the actuator 862 is coupled to the top mount 774 with an intermediate top mount 1076 being arranged therebetween. The intermediate top mount 1076 transfers forces of the second load path between the actuator 862 (e.g., the inner housing 862g thereof). The intermediate top mount 1076 may also provide similar damping functions of the upper isolator 876a and/or the lower isolator 876b by restraining motion between the actuator 862 and the top mount 774 (e.g., in rotational, radial, and axial directions) damping vibrations therebetween (e.g., from operation of the actuator 862 and/or from road disturbances).

Refer to the descriptions above of the suspension systems 160, 660, 760, 860, 960 for further description of other parts and features of the suspension system 1060, including those identified in FIG. 10.

Figure 11A:
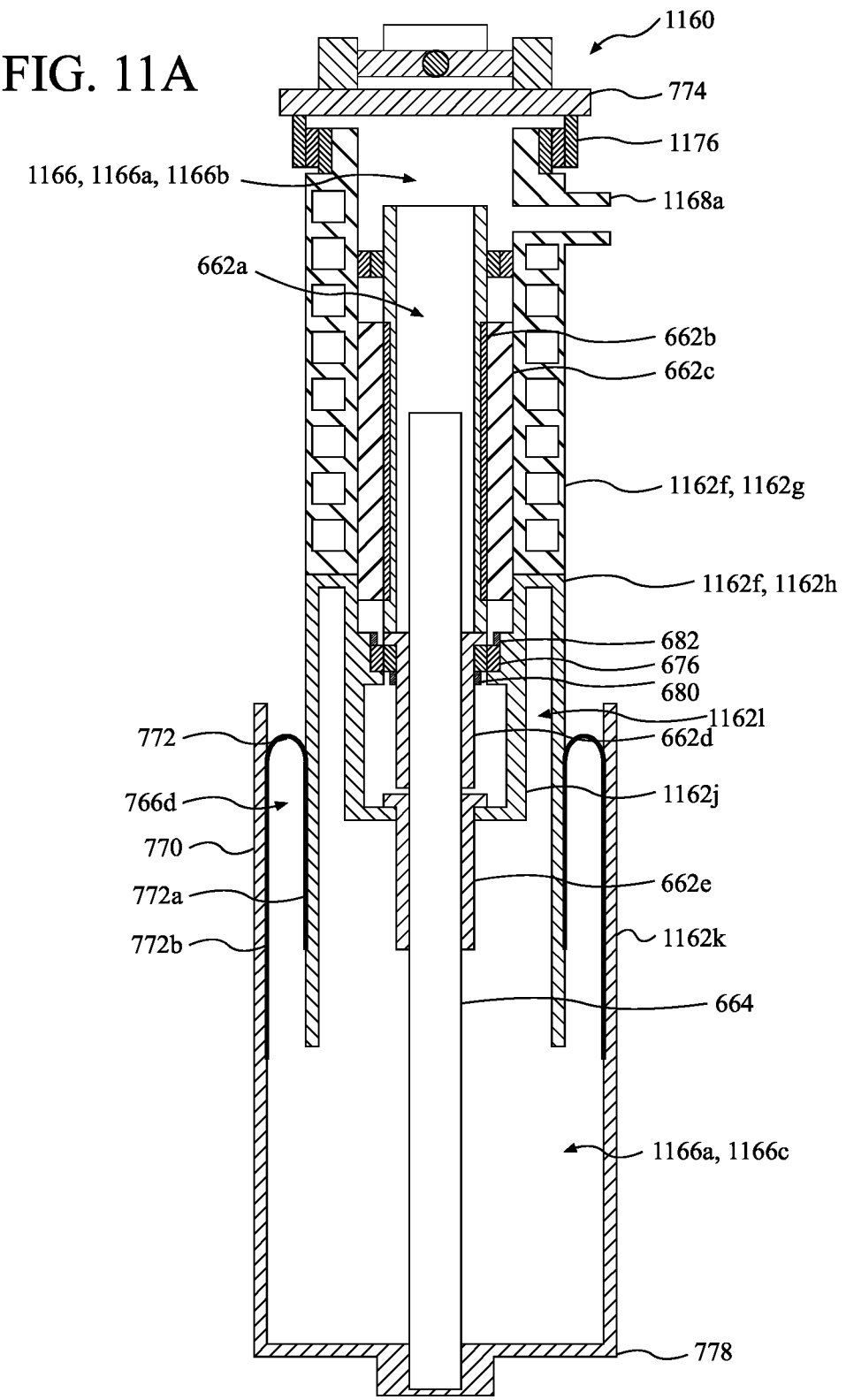
FIG. 11A is a cross-sectional schematic view of another suspension system for use in the vehicle of FIG. 1.
Figure 11B:
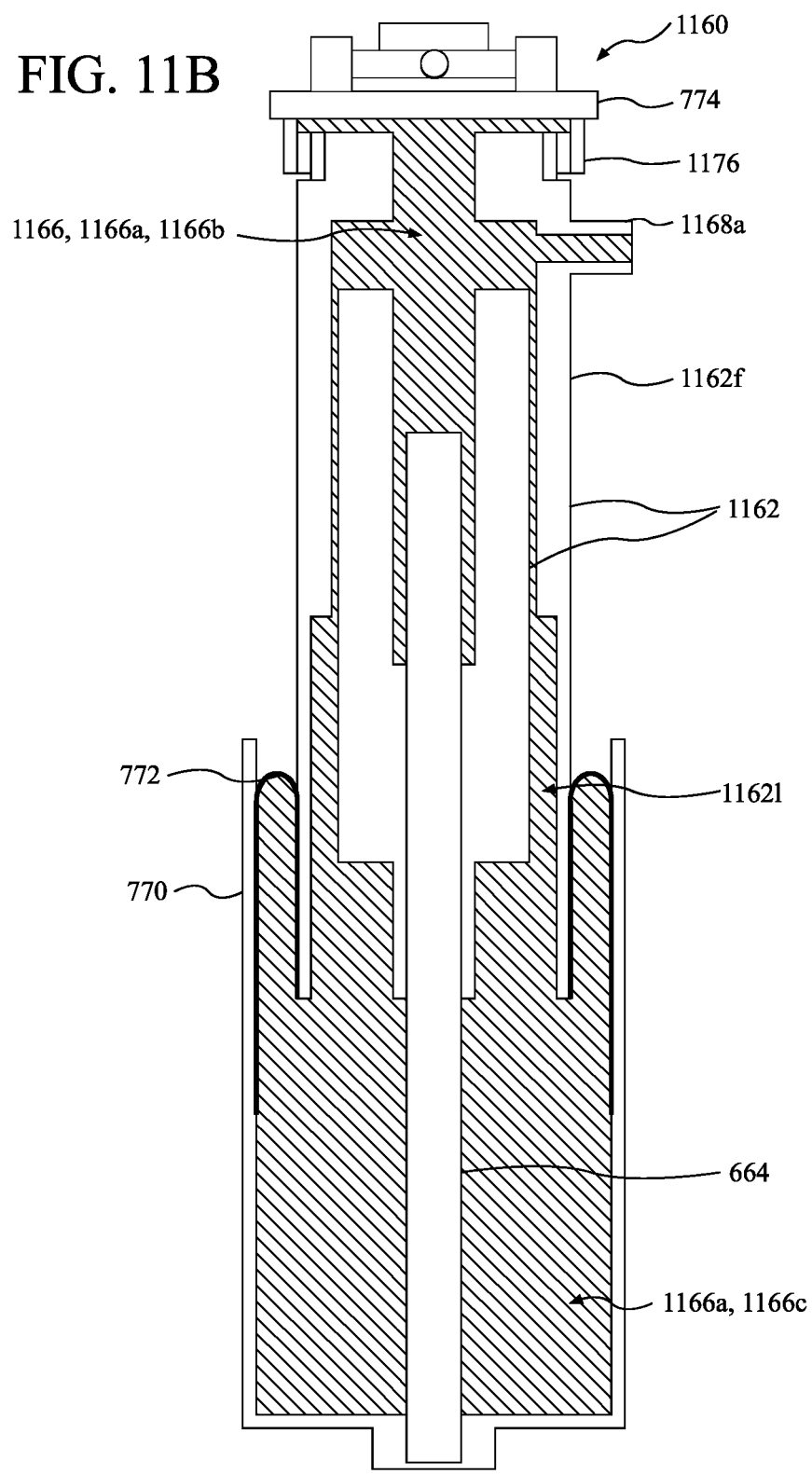
FIG. 11B is a cross-sectional schematic view of the suspension system of FIG. 11A with a pressurized cavity indicated in cross-hatching.

Referring to FIGS. 11A-11B, a suspension system 1160 is a variation of the suspension system 860. The suspension system 1160 generally includes an actuator 1162, the shaft 664, an air spring 1166 having a pressurized cavity 1166a, the lower housing 770, and the membrane 772. The air spring 1166 forms the first load path between the top mount 774 and the bottom mount 778. The actuator 1162 and the shaft 664 form the second load path between the top mount 774 and the bottom mount 778.

A primary difference between the suspension system 1160 and the suspension system 860 is the omission of the upper housing 868. Without the upper housing 868, the pressurized cavity 1166a is formed by a housing 1162f of the actuator 1162, the lower housing 770, and the membrane 772 that seals lower housing 770 to the housing 1162f of the actuator 1162. The omission of the upper housing 868 may comparatively simplify and reduce weight of the suspension system 1160. The cavity 1166a is identified by cross-hatching in FIG. 11B.

The actuator 1162 is a variation of the actuator 862. The actuator 1162, includes the motor 662a (i.e., including the rotor 662b and the stator 662c), the ball nut 662d, and the ball spline 662e, and a housing 1162f. The housing 1162f is a variation of the inner housing 662f, which extends further downward relative to the actuator 1162 than the inner housing 662f relative to the actuator 662.

The housing 1162f is a rigid annular structure that generally includes an upper housing portion 1162g and a lower housing portion 1162h, which are coupled to each other or integrally formed with each other as described previously. The housing 1162f may include more or fewer components than the upper housing portion 1162g and the lower housing portion 1162h.

The housing 1162f may be configured similar to the upper inner housing portion 662h, for example, by surrounding the motor 662a (e.g., being fixedly coupled to the stator 662c and/or rotatably supporting the rotor 662b with the upper bearing assembly 678) and including cooling passages (shown; not labeled).

An upper end of the actuator 1162 (e.g., an upper end of the upper housing portion 1162g) is coupled to the top mount 774 with an isolator 1176. The isolator 1176 may be configured as a tube isolator or bushing similar to the isolator 776, for example, by having inner and outer rigid rings coupled to and separated by an intermediate compliant ring. The isolator 1176 is rigidly coupled to each of the actuator 1162 and the top mount 774, for example, with the outer rigid ring being coupled to the top mount 774 and the inner rigid ring being coupled to the actuator 1162 (e.g., to the housing 1162f, such as the upper housing portion 1162g on an outer radial surface thereof).

In an alternative arrangement, the outer rigid ring of the isolator 1176 may be coupled to the housing 1162f of the actuator 1162 (e.g., to an inner surface thereof), while the inner rigid ring of the isolator 1176 is coupled to the top mount 774 (e.g., to an axially extending portion, such as the annular flange described above with respect to the suspension system 760 or a load cell of the top mount 774). Various packaging advantages may be provided by providing the isolator 1176 radially inward of the housing 1162f, for example, by allowing the load cell of the top mount 774 to be smaller and/or positioned within the isolator 1176. The housing 1162f of the actuator 1162 may be considered an outer housing of the suspension system 1160.

The upper housing portion 1162g defines an upper chamber 1166b of the pressurized cavity 1166a. The isolator 1176 functions to seal the housing 1162f of the actuator 1162 to the top mount 774 to define a portion of the pressurized cavity 1166a of the air spring 1166. The upper chamber 1166b, similar to the upper chambers 766b, 866b described previously, may contain therein the motor 662a (e.g., the rotor 662b and the stator 662c), which is subject the pressurized air.

The upper housing portion 1162g additionally includes a port 1168a by which air is communicated into and out of the pressurized cavity 1166a. For example, as described above, air may be added to or removed from the pressurized cavity 1166a to raise or lower a ride height of the vehicle (e.g., by displacing the vehicle body 102 relative to the unsprung component 306).

The lower housing portion 1162h may be configured, in various aspects, similar to the lower inner housing portion 662g, for example, by including an inner annular portion 1162j that surrounds the ball nut 662d and/or the ball spline 662e (e.g., being fixedly coupled to the ball spline 662e and/or rotatably supporting the ball nut 662d with a bearing assembly 676, such as a thrust bearing).

The lower housing portion 1162h is sealingly coupled to the lower housing 770 with the membrane 772, such that the lower housing portion 1162h, the housing 770, and the membrane 772 cooperatively define a lower chamber 1166c of the pressurized cavity 1166a of the air spring. For example, the lower housing portion 1162h includes an outer annular portion 1162k to which the membrane 772 is coupled. As the suspension system 1160 changes length, the outer annular portion 1162k of the lower housing portion 1162h and the lower housing 770 translate relative to each other (e.g., the lower housing 770 receiving the housing 1162f therein), while inner and outer portions of the membrane 772 translate past each other (as described previously).

The outer annular portion 1162k may be positioned radially outward of the inner annular portion 1162j, so as to define an annular channel 1162l therebetween. As the length of the suspension system 1160 changes or air is added to or removed from the pressurized cavity 1166a, air passes through the annular channel 1162l between the upper chamber 1166b and the lower chamber 1166c of the pressurized cavity 1166a.

The actuator 1162 is configured similar to the actuator 862 to allow air to pass therethrough between the upper chamber 1166b and the lower chamber 1166c, such as through axial channels in the housing 1162f, channels and/or gaps between the housing 1162f and the stator 662c and/or between the rotor 662b and the stator 662c, such channels and/or gaps being illustrated schematically in FIG. 11B.

As referenced above, the first load path is formed by the air spring 1166, whereby pressurized gas in the cavity 1166a transfers force of the first load path between the top mount 774 and the bottom mount 778. The second load path is in parallel to the first load path and is formed by the actuator 1162, whereby force of the second load path is transferred between the top mount 774 and the bottom mount 778 by the shaft 664, the ball nut 662d, the housing 1162f, and the isolator 1176 (e.g., by the compliant intermediate ring thereof). The housing 1162f may function to both define the pressurized cavity 1166a, while also transferring force of the second load path. The isolator 1176 may function to both seal the pressurized cavity 1166a of the air spring 1166, while also transferring force of the second load path. The pressurized cavity 1166a may be cooperatively defined by the top mount 1174, the isolator 1176, the housing 1162f of the actuator 1162, the flexible membrane 772, and the bottom mount 774, and may be further defined by another housing coupled to the bottom mount 774. The housing 1162*f* of the actuator 1162 may form an outer housing of the suspension system 1160.

Refer to the descriptions above of the suspension systems 160, 660, 760, 860, 960, 1060 for further description of other parts and features of the suspension system 1160, including those identified in FIGS. 11A-11B.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A suspension actuator comprising:
a top mount;
a bottom mount;
an upper housing that extends from the top mount;
a lower housing that extends from the bottom mount;
an air spring configured to form a first load path between a first portion of a vehicle and a second portion of the vehicle, the air spring including a pressurized cavity having an upper chamber that is defined by the upper housing, and a lower chamber that is defined by the lower housing and a membrane that extends radially between the upper housing and the lower housing, wherein the pressurized cavity contains a pressurized gas that transfers force of the first load path; and
a ball-screw actuator configured to form a second load path between the first portion of the vehicle and the second portion of the vehicle in parallel to the first load path, the ball-screw actuator comprising a motor coupled to the upper housing and having a stator and a rotor,
wherein an air flow path is defined radially outward from the stator such that the upper chamber and the lower chamber of the pressurized cavity are in fluidic communication with each other through the air flow path.

2. The suspension actuator of claim 1, wherein the motor of the ball-screw actuator is contained in the pressurized cavity.

3. The suspension actuator of claim 1, wherein the air flow path is defined by a channel between the upper housing and the stator.

4. The suspension actuator of claim 1, wherein the air flow path is defined by a gap between the upper housing and the stator.

5. The suspension actuator of claim 1, wherein the air flow path is defined by an axial channel in the upper housing.

6. The suspension actuator of claim 1, wherein the ball-screw actuator further comprises:
a shaft;
a ball nut to which the motor applies torque to transfer force of the second load path between the upper housing and the shaft; and
a ball spline that applies torque to the shaft to prevent rotation thereof relative to the upper housing.

7. The suspension actuator of claim 6, wherein the upper housing, the stator, and the ball spline are coupled to each other to form a stationary assembly, and the rotor and the ball nut are coupled to each other to form a rotating assembly that is rotatably supported and axially fixed to the stationary assembly with a thrust bearing.

8. The suspension actuator of claim 7, wherein the thrust bearing is coupled to the ball nut and the upper housing.

9. The suspension actuator of claim 8, wherein the upper housing transfers the force of the second load path.

10. The suspension actuator of claim 9, wherein the stator is in contact with an inner surface of the upper housing.

11. The suspension actuator of claim 6, wherein the upper housing surrounds the motor and the ball nut.

12. The suspension actuator of claim 1, wherein the upper housing surrounds the motor and includes cooling passages for receiving a fluid for cooling the motor.

13. The suspension actuator of claim 1, wherein an upper end of the upper housing is coupled to the top mount with an isolator.

14. The suspension actuator of claim 13, wherein the isolator includes inner and outer rigid rings coupled to and separated by an intermediate compliant ring.

15. A suspension actuator comprising:
an upper housing;
a lower housing;
an air spring disposed between the upper housing and the lower housing and configured to form a first load path between a sprung mass of a vehicle and an unsprung mass of the vehicle; and
a ball-screw actuator configured to form a second load path between the sprung mass and the unsprung mass in parallel to the first load path, the ball-screw actuator comprising:
a motor coupled to the upper housing and having a stator and a rotor,
a shaft,
a ball nut to which the motor applies torque to transfer force of the second load path between the upper housing and the shaft, and
a ball spline that applies torque to the shaft to prevent rotation thereof relative to the upper housing,
wherein the upper housing, the stator, and the ball spline are coupled to each other to form a stationary assembly, and the rotor and the ball nut are coupled to each other to form a rotating assembly that is rotatably supported and axially fixed to the stationary assembly with a thrust bearing.

16. The suspension actuator of claim 15, wherein the thrust bearing is coupled to the ball nut and the upper housing.

17. The suspension actuator of claim 16, wherein the rotating assembly is further rotatably supported by the upper housing with another bearing coupled to the upper housing and the rotor.

18. The suspension actuator of claim 17, wherein the other bearing is spaced apart from and positioned axially above the thrust bearing.

19. The suspension actuator of claim 17, wherein the stator is positioned axially between the thrust bearing and the other bearing.

20. A suspension actuator comprising:
an upper housing;
a lower housing;
an air spring configured to form a first load path between a vehicle body of a vehicle and a wheel of the vehicle, the air spring including a pressurized cavity having an upper chamber that is defined by the upper housing, and a lower chamber that is defined by the lower housing and a membrane that extends radially between the upper housing and the lower housing, wherein the pressurized cavity contains a pressurized gas that transfers force of the first load path; and a ball-screw actuator configured to form a second load path between the vehicle body and the wheel in parallel to the first load path, the ball-screw actuator comprising a motor, wherein the upper housing surrounds the motor and includes cooling passages for receiving a fluid for cooling the motor.

21. The suspension actuator of claim 20, wherein the motor comprises a stator and a rotor, with the stator in contact with an inner surface of the upper housing.

* * * * *